(12) United States Patent
Xiao et al.

(10) Patent No.: US 11,412,508 B2
(45) Date of Patent: Aug. 9, 2022

(54) DATA TRANSMISSION METHOD AND DEVICE

(71) Applicant: HUAWEI TECHNOLOGIES CO., LTD., Shenzhen (CN)

(72) Inventors: Shuai Xiao, Wuhan (CN); Min Zha, Shenzhen (CN); Xingyao Chen, Shenzhen (CN); Renlei Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 16/879,132

(22) Filed: May 20, 2020

(65) Prior Publication Data

US 2020/0288468 A1 Sep. 10, 2020

Related U.S. Application Data

(63) Continuation of application No. PCT/CN2018/115369, filed on Nov. 14, 2018.

(30) Foreign Application Priority Data

Nov. 21, 2017 (CN) .......................... 201711168578.8

(51) Int. Cl.
*H04W 72/04* (2009.01)
*H04W 72/06* (2009.01)

(52) U.S. Cl.
CPC ....... *H04W 72/0446* (2013.01); *H04W 72/06* (2013.01)

(58) Field of Classification Search
None
See application file for complete search history.

(56) References Cited

U.S. PATENT DOCUMENTS

| 10,382,167 | B2* | 8/2019 | Gareau | H04L 49/351 |
| 10,862,612 | B2* | 12/2020 | Zha | H04L 5/0053 |
| 10,931,392 | B2* | 2/2021 | Xiang | H04J 3/1658 |
| 11,101,908 | B2* | 8/2021 | Zhong | H04J 3/24 |
| 11,134,029 | B2* | 9/2021 | Zhang | H04L 5/0094 |
| 11,171,860 | B2* | 11/2021 | Chen | H04L 45/26 |

(Continued)

FOREIGN PATENT DOCUMENTS

| CN | 101193060 A | 6/2008 |
| CN | 101489304 A | 7/2009 |

(Continued)

OTHER PUBLICATIONS

US 11,140,066 B2, 10/2021, Chen (withdrawn)*

(Continued)

*Primary Examiner* — Tri H Phan
(74) *Attorney, Agent, or Firm* — Hauptman Ham, LLP

(57) ABSTRACT

A cell reselection method includes generating, by a radio access network device, cell reselection information, wherein the cell reselection information includes an identifier of at least one carrier frequency and an identifier of a network slice supported by each of the at least one carrier frequency. The cell reselection method further includes sending, by the radio access network device, the cell reselection information to a terminal device, wherein the cell reselection information is useable by the terminal device for cell reselection.

15 Claims, 30 Drawing Sheets

(56) References Cited

U.S. PATENT DOCUMENTS

| 11,252,098 B2* | 2/2022 | Wu | H04J 3/1658 |
| 2009/0180478 A1 | 7/2009 | Yu et al. | |

FOREIGN PATENT DOCUMENTS

| CN | 101977385 A | 2/2011 |
| CN | 106357421 A | 1/2017 |
| CN | 106411454 A | 2/2017 |
| CN | 106911426 A | 6/2017 |
| CN | 108011702 A | 5/2018 |
| WO | 0049828 A1 | 8/2000 |

OTHER PUBLICATIONS

OIF: "IA OIF-FLEXE-01.0 Flex Ethernet Implementation Agreement", Mar. 1, 2016, pp. 1-31, total 31 pages, XP055459137.
European Search Report issued in corresponding European Application No. 18880446.2, dated Dec. 3, 2020, pp. 1-9, European Patent Office, Munich, Germany.
IEEE P802.3bs /D3.0, Jan. 10, 2017, Draft Standard for Ethernet Amendment: Media Access Control Parameters, Physical Layers and Management Parameters for 200 GB/s and 400 GB/s Operation, total 387 pages.
IA # OIF-FLEXE-01.1, Flex Ethernet Implementation Agreement, Jun. 21, 2017. total 35 pages.

\* cited by examiner

| Block # | SH | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | | | | | | | | | | | | | | | | | | | | | | | | | | | | | | | | | Bit position | | | | | | | | | | | | | | | | | | | | | | | | | | | |
| 1 | 1 | 0 | | | 0x4B | | | | | | | | | | | | | | | | | | FlexE group number | | | | | | | | | | | | | | | | | | | | | | | | | 0x000_0000 | | | | | | | | | | |
| 2 | 0 | 1 | C | | PHY map | | | | | | | | | | | | | | | | PHY number | | | | | | | | | | | | | | | Reserved | | | | | | | | | | | | | | | | | | | | | | CRC-16 | | | |
| 3 | 0 | 1 | C | | Client calendar A | | | | | | | | | | | | | | | | | | | | | | | | | Client calendar B | | | | | | | | | | | | | | | | | Reserved | | | | | | | | | | | | | | |
| 4 | S | S | | | Management channel (two 66B blocks) | | | | | | | | | | | | | | | | | | | | | | | | | | | | | | | | | | | | | | | | | | | | | | | | | | | | | | | | |
| 5 | S | S | | | | | | | | | | | | | | | | | | | | | | | | | | | | | | | | | | | | | | | | | | | | | | | | | | | | | | | | | | | | |
| 6 | S | S | | | Management channel (three 66B blocks) | | | | | | | | | | | | | | | | | | | | | | | | | | | | | | | | | | | | | | | | | | | | | | | | | | | | | | | | |
| 7 | S | S | | | | | | | | | | | | | | | | | | | | | | | | | | | | | | | | | | | | | | | | | | | | | | | | | | | | | | | | | | | | |
| 8 | S | S | | | | | | | | | | | | | | | | | | | | | | | | | | | | | | | | | | | | | | | | | | | | | | | | | | | | | | | | | | | | |

FIG. 3

| sync | 0–7 | 8–24 | 25–31 | 32–35 | 36–63 |
|------|------|------|-------|-------|-------|
| 10 | 0×4B | Slot control information | 0×0 | X | 0×0 |

FIG. 16 a device, to resolve the following problem: It takes a relatively long time to learn of information about a sequence relationship, leading to a large time interval, and it takes a relatively long time to restore data in a slot group.

DATA TRANSMISSION METHOD AND DEVICE

CROSS-REFERENCE TO RELATED APPLICATIONS

This application is a continuation of International Application No. PCT/CN2018/115369, filed on Nov. 14, 2018, which claims priority to Chinese Patent Application No. 201711168578.8, filed on Nov. 21, 2017. The disclosures of the aforementioned applications are hereby incorporated by reference in their entireties.

TECHNICAL FIELD

This application relates to the field of communications technologies, and in particular, to a data transmission method and a device.

BACKGROUND

With continuous development of communications technologies, a flexible Ethernet (flexible ethernet, FlexE for short) technology is proposed. In the FlexE technology, data of a client (client) needs to be transmitted by using a FlexE frame. Different clients may be located on a same card, or different clients may be located on different cards.

In the prior art, 20 slots (slot) may be divided, n*20 slots is used as a cycle, and the n*20 slots are grouped into n slot groups with each including 20 slots. Further, data of a client may be added to a slot in a slot group, and then slots in the slot group are sequentially sent to a receiving device. In the foregoing process, there is a sequence relationship between slots in a same slot group. Information about the sequence relationship between the slots also needs to be sent to the receiving device, so that the receiving device learns of the sequence relationship between the slots in the slot group. The information about the sequence relationship may be placed in the first code block (block) in an overhead frame. In this case, when the slot group is being sent, the overhead frame is first sent to the receiving device, and then the slots in the slot group are sequentially sent to the receiving device.

However, in the prior art, a size of the overhead frame is 8 rows*1 column of 66-bit code blocks, and a size of the slot group is 8 rows*(1023*20) columns of 66-bit payload code blocks. The overhead frame is transmitted before the slot group. Therefore, the overhead frame needs to be transmitted only once every 8*1023*20*66 bits. To be specific, the overhead frame is transmitted only once about every 108 μs. Because the information about the sequence relationship between the slots in the slot group is placed in the overhead frame, it takes a relatively long time to learn of the information about the sequence relationship, leading to a large time interval. Because data in the slot group needs to be restored based on the information about the sequence relationship, the restoration takes a relatively long time. This is not conducive to fast link establishment, link detection, and dynamic rate switching.

SUMMARY

This application provides a data transmission method and

According to a first aspect, this application provides a data transmission method, including:

adding data of at least one first device to a slot in a slot group, where the slot group includes N slots, a first slot is any slot in the slot group, the first slot includes M subslots, sequence information of the M subslots is located in any one of the M subslots, and both M and N are positive integers; and sending the data of the at least one first device to a second device by using the slot group.

In a possible design, a second slot is any slot in the slot group, the second slot includes Q subslots, Q is different from M, and Q is a positive integer. It may be understood that the second slot and the first slot are not a same slot.

Sequence information of the Q subslots is located in any one of the Q subslots.

In a possible design, data of a same first device is located in different slots.

In a possible design, data of a same first device is located in different subslots of a same slot.

In a possible design, data of different first devices is located in different slots.

In a possible design, data of different first devices is located in different subslots of a same slot.

In a possible design, the sequence information represents a rank of a subslot that carries the sequence information in a slot.

In a possible design, rates of subslots belonging to a same slot are different or the same.

According to a second aspect, this application provides a data transmission method, including:

receiving a slot group sent by a third device, where the slot group includes N slots, a slot in the slot group carries data of at least one first device, a first slot is any slot in the slot group, the first slot includes M subslots, sequence information of the M subslots is located in any one of the M subslots, and both M and N are positive integers; and restoring the data of the at least one first device from the slot in the slot group.

In a possible design, a second slot is any slot in the slot group, the second slot includes Q subslots, Q is different from M, and Q is a positive integer; and sequence information of the Q subslots is located in any one of the Q subslots.

In a possible design, data of a same first device is located in different slots.

In a possible design, data of a same first device is located in different subslots of a same slot.

In a possible design, data of different first devices is located in different slots.

In a possible design, data of different first devices is located in different subslots of a same slot.

In a possible design, the sequence information represents a rank of a subslot that carries the sequence information in a slot.

In a possible design, rates of subslots belonging to a same slot are different or the same.

According to a third aspect, this application provides a communications device, including:

an addition module, configured to add data of at least one first device to a slot in a slot group, where the slot group includes N slots, a first slot is any slot in the slot group, the first slot includes M subslots, sequence information of the M subslots is located in any one of the M subslots, and both M and N are positive integers; and a sending module, configured to send the data of the at least one first device to a second device by using the slot group.

In a possible design, a second slot is any slot in the slot group, the second slot includes Q subslots, Q is different from M, and Q is a positive integer; and sequence information of the Q subslots is located in any one of the Q subslots.

In a possible design, data of a same first device is located in different slots.

In a possible design, data of a same first device is located in different subslots of a same slot.

In a possible design, data of different first devices is located in different slots.

In a possible design, data of different first devices is located in different subslots of a same slot.

In a possible design, the sequence information represents a rank of a subslot that carries the sequence information in a slot.

In a possible design, rates of subslots belonging to a same slot are different or the same.

According to a fourth aspect, this application provides a communications device, including:

a receiving module, configured to receive a slot group sent by a third device, where the slot group includes N slots, a slot in the slot group carries data of at least one first device, a first slot is any slot in the slot group, the first slot includes M subslots, sequence information of the M subslots is located in any one of the M subslots, and both M and N are positive integers; and a restoration module, configured to restore the data of the at least one first device from the slot in the slot group.

In a possible design, a second slot is any slot in the slot group, the second slot includes Q subslots, Q is different from M, and Q is a positive integer; and sequence information of the Q subslots is located in any one of the Q subslots.

In a possible design, data of a same first device is located in different slots.

In a possible design, data of a same first device is located in different subslots of a same slot.

In a possible design, data of different first devices is located in different slots.

In a possible design, data of different first devices is located in different subslots of a same slot.

In a possible design, the sequence information represents a rank of a subslot that carries the sequence information in a slot.

In a possible design, rates of subslots belonging to a same slot are different or the same.

According to a fifth aspect, this application provides a communications device, including:

a processor and a transmitter, where the processor is configured to add data of at least one first device to a slot in a slot group, where the slot group includes N slots, a first slot is any slot in the slot group, the first slot includes M subslots, sequence information of the M subslots is located in any one of the M subslots, and both M and N are positive integers; and the transmitter is configured to send the data of the at least one first device to a second device by using the slot group.

In a possible design, a second slot is any slot in the slot group, the second slot includes Q subslots, Q is different from M, and Q is a positive integer; and sequence information of the Q subslots is located in any one of the Q subslots.

In a possible design, data of a same first device is located in different slots.

In a possible design, data of a same first device is located in different subslots of a same slot.

In a possible design, data of different first devices is located in different slots.

In a possible design, data of different first devices is located in different subslots of a same slot.

In a possible design, the sequence information represents a rank of a subslot that carries the sequence information in a slot.

In a possible design, rates of subslots belonging to a same slot are different or the same.

According to a sixth aspect, this application provides a communications device, including:

a processor and a receiver, where the receiver is configured to receive a slot group sent by a third device, where the slot group includes N slots, a slot in the slot group carries data of at least one first device, a first slot is any slot in the slot group, the first slot includes M subslots, sequence information of the M subslots is located in any one of the M subslots, and both M and N are positive integers: and the processor is configured to restore the data of the at least one first device from the slot in the slot group.

In a possible design, a second slot is any slot in the slot group, the second slot includes Q subslots, Q is different from M, and Q is a positive integer: and sequence information of the Q subslots is located in any one of the Q subslots.

In a possible design, data of a same first device is located in different slots.

In a possible design, data of a same first device is located in different subslots of a same slot.

In a possible design, data of different first devices is located in different slots.

In a possible design, data of different first devices is located in different subslots of a same slot.

In a possible design, the sequence information represents a rank of a subslot that carries the sequence information in a slot.

In a possible design, rates of subslots belonging to a same slot are different or the same.

According to a seventh aspect, a communications device is provided, including a memory, a processor, and a computer program that is stored in the memory and that may be executed by the processor, where the processor executes the computer program to implement any method in the first aspect.

According to an eighth aspect, a communications device is provided, including at least one processing element or chip configured to perform any method in the first aspect.

According to a ninth aspect, a program is provided, and the program is executed by the processor to perform any method in the first aspect.

According to a tenth aspect, a computer readable storage medium is provided, including the program in the third aspect.

According to an eleventh aspect, a communications device is provided, including a memory, a processor, and a computer program that is stored in the memory and that may be executed by the processor, where the processor executes the computer program to implement any method in the second aspect.

According to a twelfth aspect, a communications device is provided, including at least one processing element or chip configured to perform any method in the second aspect.

According to a thirteenth aspect, a program is provided, and the program is executed by the processor to perform any method in the second aspect.

According to a fourteenth aspect, a computer readable storage medium is provided, including the program in the fourth aspect.

It may be learned that, in the foregoing various aspects, the data of the at least one first device is added to the slot in the slot group, where the slot group includes the N slots, the first slot is any slot in the slot group, the first slot includes the M subslots, the sequence information of the M subslots is located in any one of the M subslots, and both M and N are positive integers; and the data of the at least one first device is sent to the second device by using the slot group. Sequence information of subslots of a slot is placed in any subslot of the slot, instead of being placed in an overhead frame, and therefore a receive end can learn of information about a sequence relationship in a relatively short time, reducing a time interval. Further, the receive end learns of the sequence information of the subslots in a relatively short time, and therefore when the receive end restores data in a slot group based on the information about the sequence relationship, a restoration time is shortened. This facilitates fast link establishment, link detection, and dynamic rate switching. Because the sequence information of the subslots is added to the slot in the slot group, the sequence information of the subslots can be transparently transmitted in a large-scale synchronous switching network that is based on a FlexE interface. In addition, the sequence information of the subslots can be transparently transmitted in a synchronous switching network that is based on a non-FlexE interface, so that a device in the synchronous switching network that is based on the non-FlexE interface can obtain the sequence information of the subslots, and then can determine a sequence of the subslots in the slot based on the sequence information of the subslots, to facilitate slot parsing. Furthermore, different slots in the slot group include different quantities of subslots. Therefore, rates of different slots in the slot group are different. In this case, when data is added to different slots, data of FlexE clients with different rates may be placed in different slots, so that data with different rates can be transmitted in one slot group, in other words, slots with hybrid rates can be transmitted, and data of FlexE clients with different rates can be added to one slot group in a hybrid manner. In this application, a single slot is divided, and therefore when a slot is redivided into subslots, another slot is not interfered with.

BRIEF DESCRIPTION OF DRAWINGS

FIG. 3 is a schematic diagram 1 of a frame structure of an overhead frame according to an embodiment of this application;

FIG. 16 is a diagram of a format definition of a special code block in a data transmission method according to an embodiment of this application:

DESCRIPTION OF EMBODIMENTS

Figure 1:
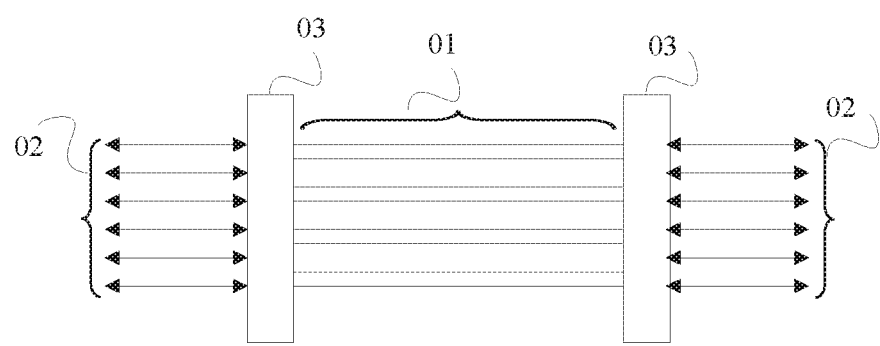
FIG. 1 is a schematic diagram of a FlexE architecture according to an embodiment of this application.

The embodiments of this application are applied to a 5th generation mobile communications technology (5th-Generation, 5G) communications system or another system that may emerge in the future. The following describes some terms in this application to facilitate understanding by a person skilled in the art. It should be noted that names of devices may change when the solutions in the embodiments of this application are applied to the 5G system or the another system that may emerge in the future, but this does not affect implementation of the solutions in the embodiments of this application.

(1) Gigabit Ethernet (gigabit ethernet, GE): a term used to describe various technologies for transmitting Ethernet frames at a rate of gigabit per second. For example, 40 GE refers to 40 gigabit Ethernet, 100 GE refers to 100 gigabit Ethernet, and 400 GE refers to 400 gigabit Ethernet.

(2) FlexE: a Flexible Ethernet (Flexible ethernet) standard protocol defined by the optical internetworking forum (optical internetworking forum, OIF) standardization organization. Based on 100 gigabit Ethernet, the FlexE provides a more flexible transmission rate than Ethernet and a time division multiplexing (TDM)-based transmission mechanism. For the FlexE, there are the following several technical names: a FlexE slot calendar (flex ethernet calendar, FlexE calendar), a FlexE client (client flex ethernet client, FlexE Client), a FlexE group (flex ethernet group, FlexE Group), and a FlexE shim (flex ethernet shim, FlexE Shim).

(3) 64B/66B block (64-bit/66-bit block): a coding scheme of a data code block that carries a 2-bit synchronization header (sync header) and eight bytes. The 64B/66B block is used as a physical layer (physical layer, PHY) transmission coding format of 10G or 40G/100G Ethernet, where B indicates a bit (Bit).

(4) Client (client): a data stream that is on a client and that is carried by using FlexE. In this application, data generated on a first device is a client data stream.

(5) Slot (slot): a minimum unit for transmitting circuit switching summary information. For the FlexE 1.0 standard, a bandwidth of each slot is 5 gigabits (gigabit, G).

(6) Card: In this application, a second device is a device for receiving data, for example, the second device is a card. Cards include a line card (line card) and a switch card (switch card).

(7) "A plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

It should be noted that the terms used in the embodiments of this application may be mutually referenced, and are not described again.

As defined by the institute of electrical and electronics engineers (institute of electrical and electronics engineers, IEEE), 802.3-based Ethernet may be used as a service interface to apply the Ethernet to various scenarios. However, a difference in a bandwidth granularity increases with technology development. To adapt to this change, a concept of flexible Ethernet (FlexE) is proposed in a Flex Ethernet Implementation Agreement technical proposal published on the optical internetworking forum (optical internet forum, OIF) in April 2016. The flexible Ethernet specifically means that at least one physical layer apparatus is established as a FlexE group (FlexE Group), and a generic mechanism for supporting different Ethernet media access control (media access control, MAC) layer rates, where the generic mechanism can support functions such as Ethernet service bonding, sub-rate, and channelization. A MAC rate provided by the FlexE may be greater than a rate of a single physical layer apparatus, or may be less than a rate of a single physical layer apparatus.

FIG. 1 is a schematic diagram of a FlexE architecture according to an embodiment of this application. As shown in FIG. 1, a FlexE group 01 includes at least one Ethernet PHY apparatus. In an existing technical proposal provided by the OIF, only a 100GE FlexE group is supported. A 400GE FlexE group may be supported in the future. Data of a FlexE client 02 is an Ethernet data stream based on a media access control (media access control MAC) layer. A rate of the FlexE client 02 may be the same as or different from an existing Ethernet PHY rate. For example, the rate of the FlexE client 02 may be 10 Gb/s, 25 Gb/s, or 40 Gb/s. As a logical layer, a FlexE shim 03 may map the data of the FlexE client 02 to the FlexE group 01, in other words, the FlexE shim 03 performs a multiplexing function in a data sending direction, and may demap data in the FlexE group 01 to the FlexE client 02, in other words, perform a demultiplexing function in a receiving direction. For a scenario of Ethernet service bonding, the architecture shown in FIG. 1 can support using two existing 100GE physical media dependents (physical media dependent, PMD) to transmit a 200G Ethernet service. For an application scenario of Ethernet service sub-rate, the architecture shown in FIG. 1 can support using one existing 100GE PMD to transmit a 50G Ethernet service. For a scenario of Ethernet service channelization, the architecture shown in FIG. 1 can support several logical ports in sharing one or more physical interfaces, and can support using two existing 100GE PMDs to transmit one 150G Ethernet service and two 25G Ethernet services.

In FlexE, with reference to a synchronous digital hierarchy/optical transport network (synchronous digital hierarchy/optical transport network, SDH/OTN) technology, a fixed frame format is constructed for data transmitted through a physical interface, and TDM slot division is performed. A granularity of the TDM slot division in the FlexE is 66B. Slots are interleaved at an interval of 66B, so that one slot can carry one 64B/66B code block.

Figure 2:
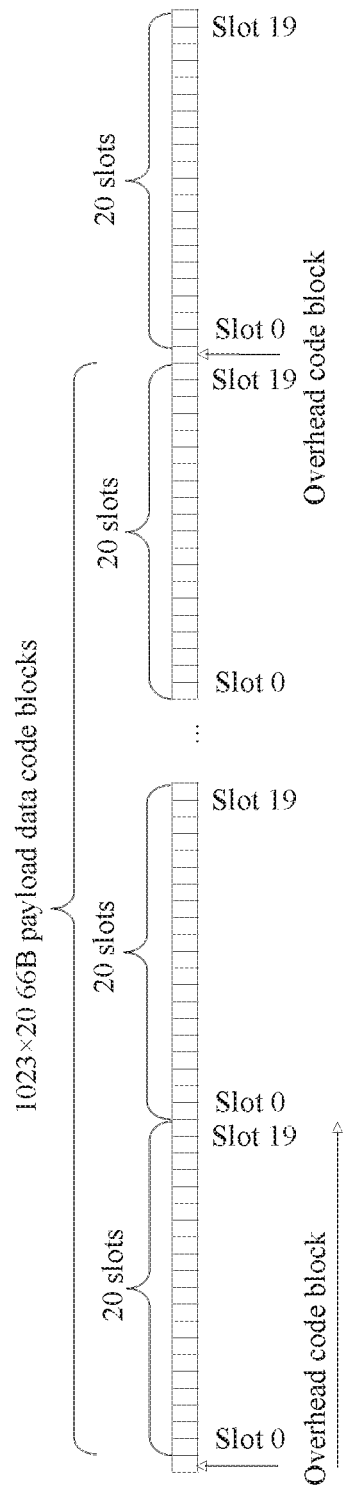
FIG. 2 is a schematic diagram of a slot according to an embodiment of this application.

FIG. 2 is a schematic diagram of a slot according to an embodiment of this application. As shown in FIG. 2, for a 100GE PHY interface, a data code block stream includes 64B/66B code blocks with a cycle of 20 slots. In this case, the data code block stream corresponds to 20 slots, and a bandwidth of each slot is approximately 5G. Data at all PHYs of FlexE is aligned by periodically inserting a FlexE overhead code block. Specifically, one 66B overhead code block FlexE overhead is inserted every 1023×20 66B payload data code blocks. Therefore, there is one FlexE overhead before every 1023×20 66B payload data code blocks, where the FlexE overhead is a FlexE overhead frame.

FlexE frames are classified into a basic frame and a multiframe. A single FlexE frame includes 8 rows*1 column of 66B overhead code blocks FlexE overhead, and 8 rows*(1023*20) columns of 66B payload code blocks; and 32 single FlexE frames constitute one FlexE multiframe.

FIG. 3 is a schematic diagram 1 of a frame structure of an overhead frame according to an embodiment of this application. As shown in FIG. 3, the overhead frame includes a FlexE group number (FlexE Group number), a PHY number (PHY number), a PHY map (PHY Map), a reserved item (Reserved), a client calendar (Client Calendar) A, a client calendar B. and the like, and a management channel (Management Channel). It may be learned that the FlexE overhead includes some fields that have specific indications, and some space used as a reserved field. In addition, the FlexE overhead further provides five 66B code blocks. The five 66B code blocks may be used as management channels to transfer information other than a data payload between two FlexE devices.

Figure 4:
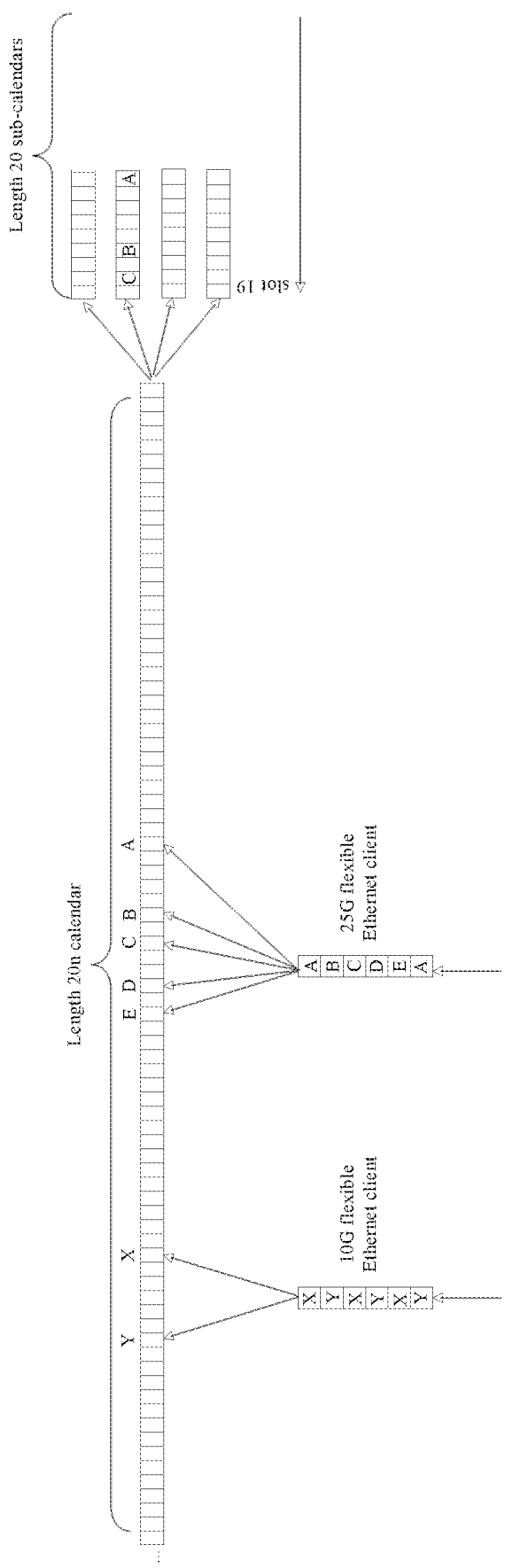
FIG. 4 is a schematic diagram of mapping a FlexE client data stream to a FlexE group according to an embodiment of this application.

FIG. 4 is a schematic diagram of mapping a FlexE client data stream to a FlexE group according to an embodiment of this application. As shown in FIG. 4, a calendar represents a diagram of a correspondence between a slot in the FlexE group and a FlexE client, and a sub-calendar represents a diagram of a correspondence between a 100GE slot in the FlexE group and a FlexE client. As shown in FIG. 4, for a 10G FlexE client, two slots may be allocated to carry data of the 10G FlexE client; and for a 25G FlexE client, five slots may be allocated to carry data of the 25G FlexE client. Slots for a same FlexE client may be distributed on different 100GE PMDs for transmission.

Figure 5:
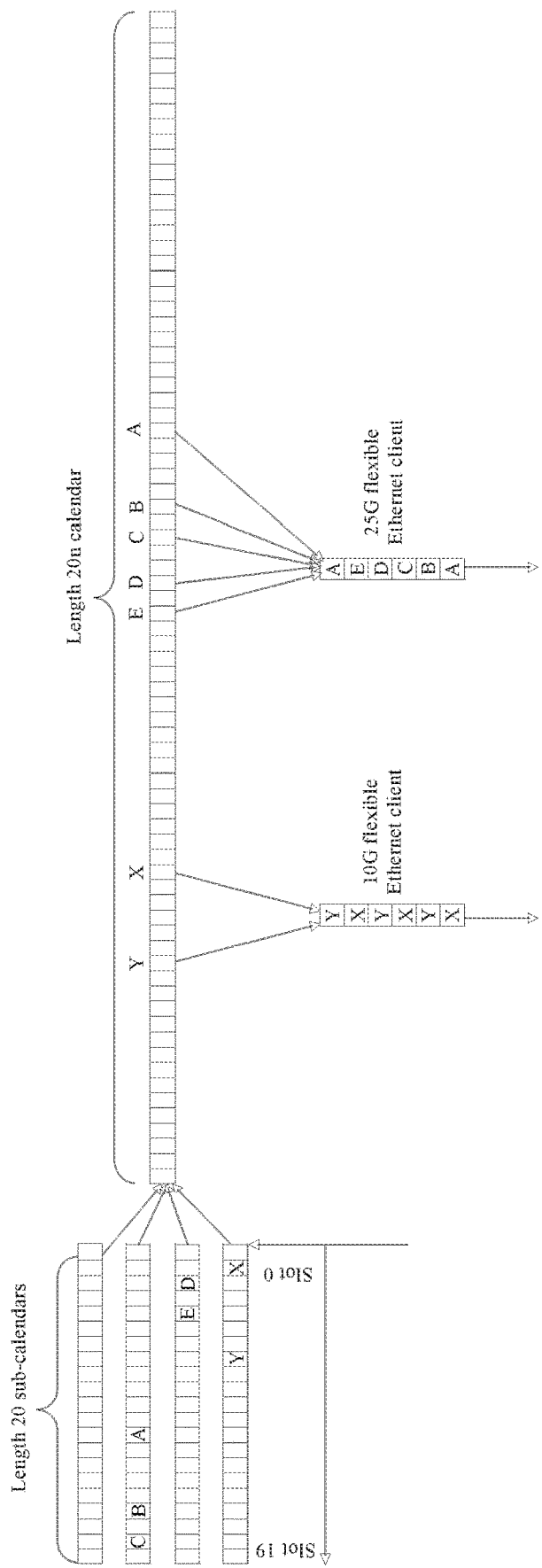
FIG. 5 is a schematic diagram of demapping a FlexE client data stream from a FlexE group according to an embodiment of this application.

FIG. 5 is a schematic diagram of demapping a FlexE client data stream from a FlexE group according to an embodiment of this application. As shown in FIG. 5, based on a calendar configuration, a FlexE client restores data from the FlexE group. In the example shown in FIG. 5, data of a 10G FlexE client and data of a 25G FlexE client can be restored from the FlexE group.

It may be learned from the foregoing description of the FlexE that, when data of a FlexE client is carried and transmitted by using the FlexE, a minimum granularity supported by the FlexE is 5G. However, in an actual application process, a required bandwidth is less than 5G in many scenarios. If data is carried by using the FlexE, a bandwidth waste problem occurs.

Figures 6, 7:
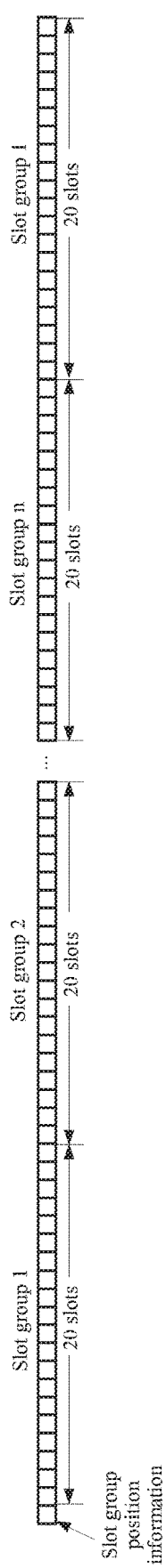
FIG. 6 is a schematic diagram of slot division in the prior art according to an embodiment of this application.
FIG. 7 is a schematic diagram 2 of a frame structure of an overhead frame according to an embodiment of this application.

FIG. 6 is a schematic diagram of slot division in the prior art according to an embodiment of this application. As shown in FIG. 6, n slot groups are obtained by using n*20 slots as a cycle. Data of different FlexE clients is carried in different slot groups. In this case, a bandwidth carried in each slot in a slot group is (1/n)*5G. The first block in an overhead frame includes a specific position relationship between slots. In other words, the first block in the overhead frame includes information about a sequence relationship between the slots. FIG. 7 is a schematic diagram 2 of a frame structure of an overhead frame according to an embodiment of this application. As shown in FIG. 7, a special value is defined in a bit 36 to a bit 41 to indicate whether the overhead frame carries subslot information; and a specific slot information position, namely, a slot group to which 20 slots following the overhead frame belong, is defined in a bit 42 to a bit 51. Slot group division is performed in a cyclically scrolling manner, and therefore when a position of each slot in a slot group is determined, a position of each slot in a following slot group is determined. In the overhead frame, C represents a calendar configuration in use, OMF represents an overhead multiframe indicator, RPF represents a remote PHY fault, CR represents a calendar switch request, CA represents a calendar switch acknowledge, and ss represents valid sync header bits (01 or 10).

Figure 8:
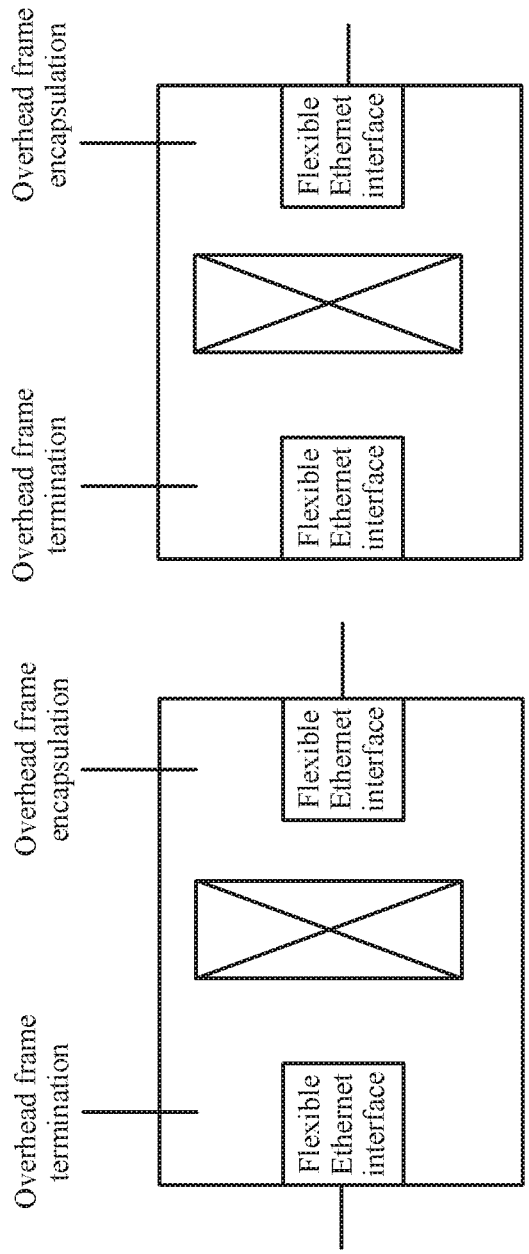
FIG. 8 is a schematic diagram 1 of data stream transmission according to an embodiment of this application.

FIG. 8 is a schematic diagram 1 of data stream transmission according to an embodiment of this application. As shown in FIG. 8, a data stream is transmitted across cards, that is, the data stream is transmitted end to end across a plurality of cards. Information about a sequence relationship between slots is placed in an overhead frame. When the data stream arrives at a card, the overhead frame needs to be parsed first, that is, the overhead frame is terminated. Then, the overhead frame needs to be re-encapsulated when the data stream is internally exchanged to another FlexE interface. Therefore, a transmission process is relatively complex. The FlexE interface is also referred to as a FlexE port.

Figure 9:
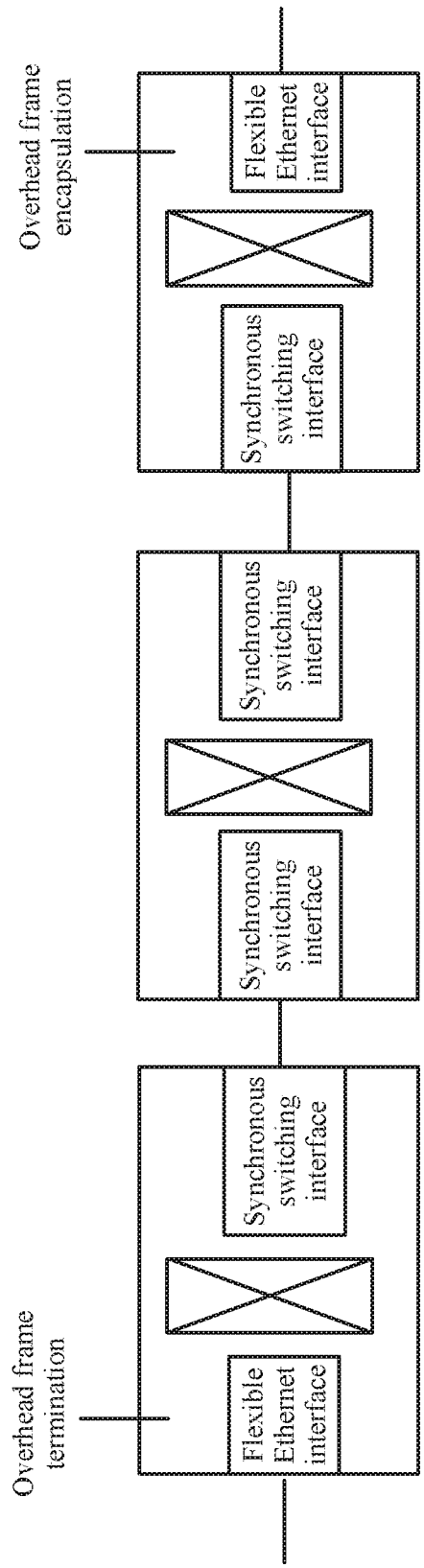
FIG. 9 is a schematic diagram 2 of data stream transmission according to an embodiment of this application.

FIG. 9 is a schematic diagram 2 of data stream transmission according to an embodiment of this application. As shown in FIG. 9, when a data stream passes through a non-FlexE synchronous interface switching network shown in FIG. 9, slot position information cannot be transparently transmitted.

In the foregoing slot division method, a size of the overhead frame is 8 rows*1 column of 66-bit code blocks, and a size of the slot group is 8 rows*(1023*20) columns of 66-bit payload code blocks. The overhead frame is transmitted before the slot group. Therefore, the overhead frame needs to be transmitted only once every 8*1023*20*66 bits. To be specific, the overhead frame is transmitted only once about every 108 μs. Because the information about the sequence relationship between the slots in the slot group is placed in the overhead frame, it takes a relatively long time to learn of the information about the sequence relationship, leading to a large time interval. Because data in the slot group needs to be restored based on the information about the sequence relationship, the restoration takes a relatively long time. This is not conducive to fast link establishment, link detection, and dynamic rate switching.

Figure 10:
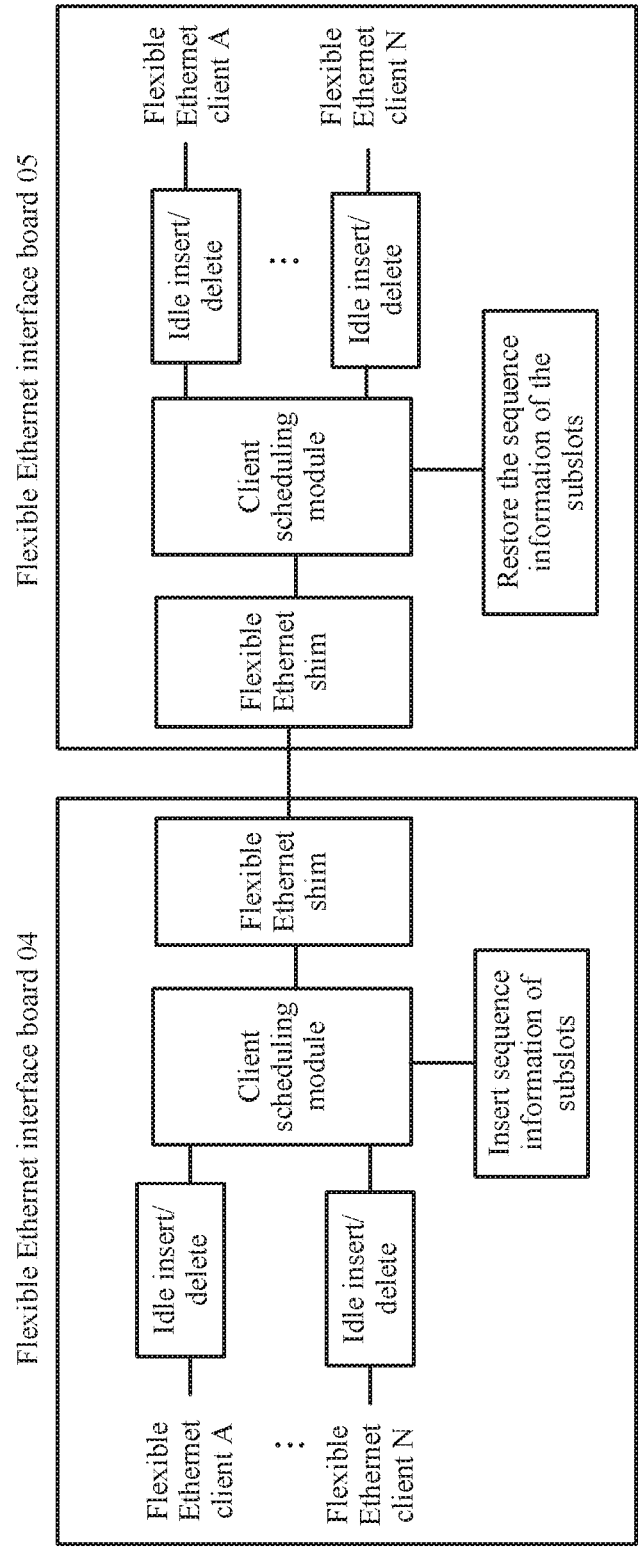
FIG. 10 is a schematic diagram 1 of an application scenario according to an embodiment of this application.
Figure 11A:
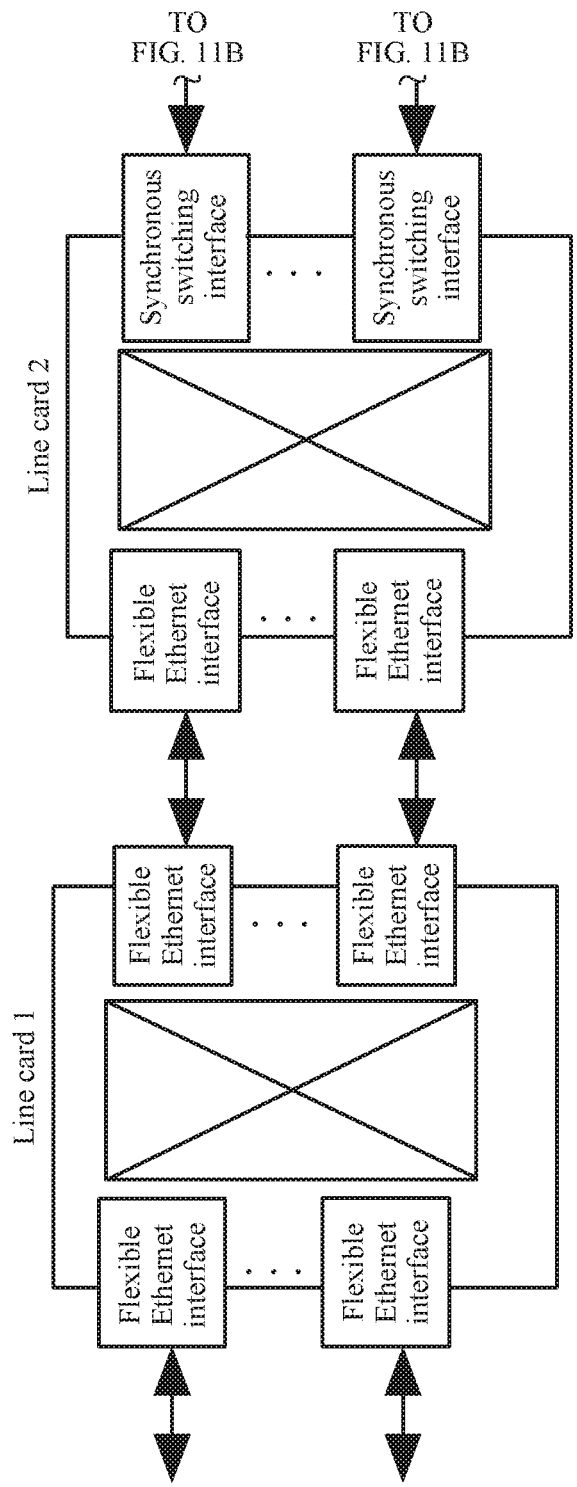
FIG. 11A, FIG. 11B, and FIG. 11C are a schematic diagram 2 of an application scenario according to an embodiment of this application.
Figure 11B:
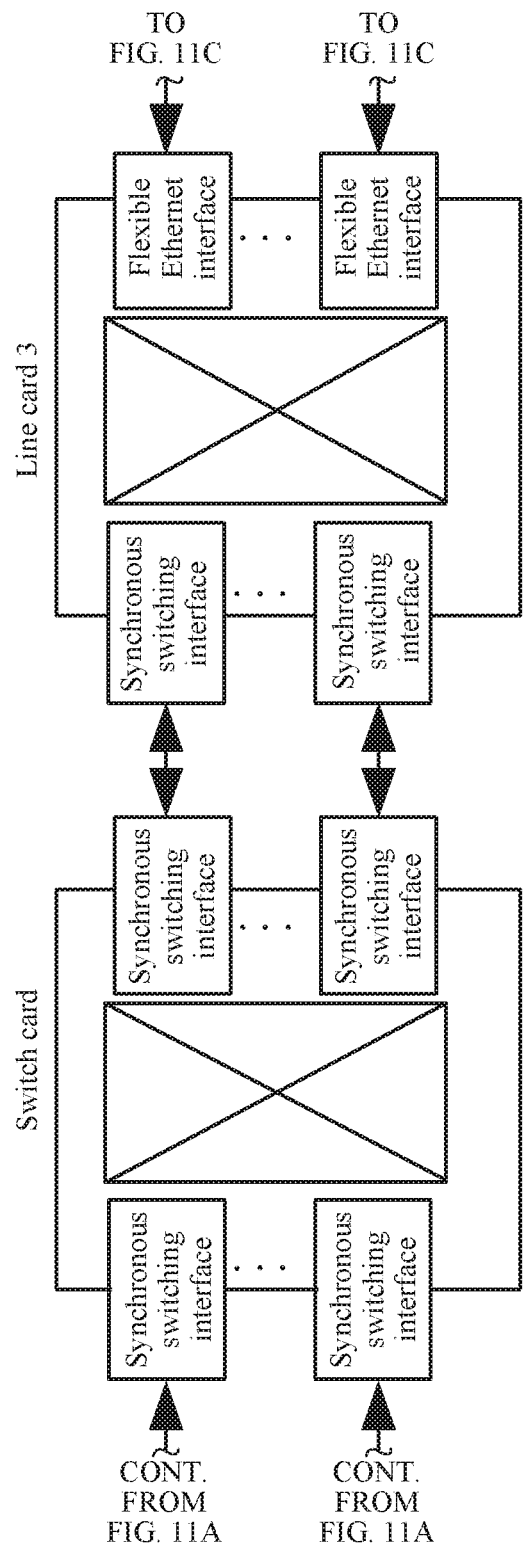
Figure 11C:
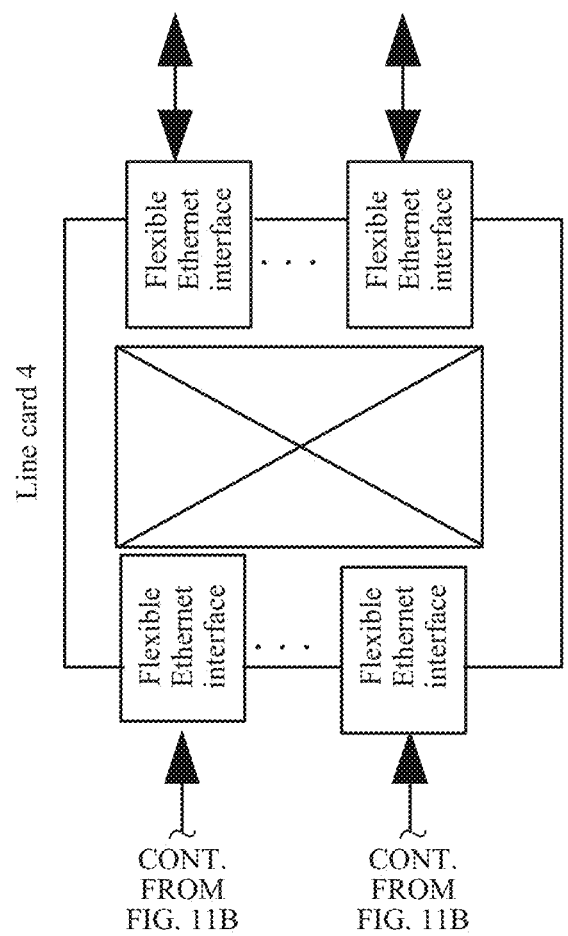

The following describes a technical solution in an example with reference to an accompanying drawing in the example. FIG. 10 is a schematic diagram 1 of an application scenario according to an embodiment of this application. An architecture shown in FIG. 10 mainly includes a FlexE interface board 04 and a FlexE interface board 05. A data stream is transmitted between the FlexE interface boards. The FlexE interface board 04 serves as a third device, and the FlexE interface board 05 serves as a second device. In this case, the FlexE interface board 04 sends data of a first device to the FlexE interface board 05. FIG. 11A, FIG. 11B, and FIG. 11C are a schematic diagram 2 of an application scenario according to an embodiment of this application. An architecture shown in FIG. 11A, FIG. 11B, and FIG. 11C mainly includes a line card 1, a line card 2, a line card 3, a line card 4, and a switch card. A data stream is transmitted on a device in a large-scale FlexE-based synchronous switching network. As shown in FIG. 1A, FIG. 11B, and FIG. 11C, during data transmission, a device that sends data of a first device serves as a third device, and a device that receives data sent by the third device serves as a second device. For example, the line card 1 serves as the third device, and the line card 1 sends the data of the first device to the line card 2. In this case, the line card 2 serves as the second device. For another example, the line card 2 serves as the third device, and the line card 2 sends the data of the first device to the switch card. In this case, the switch card serves as the second device.

Figure 12:
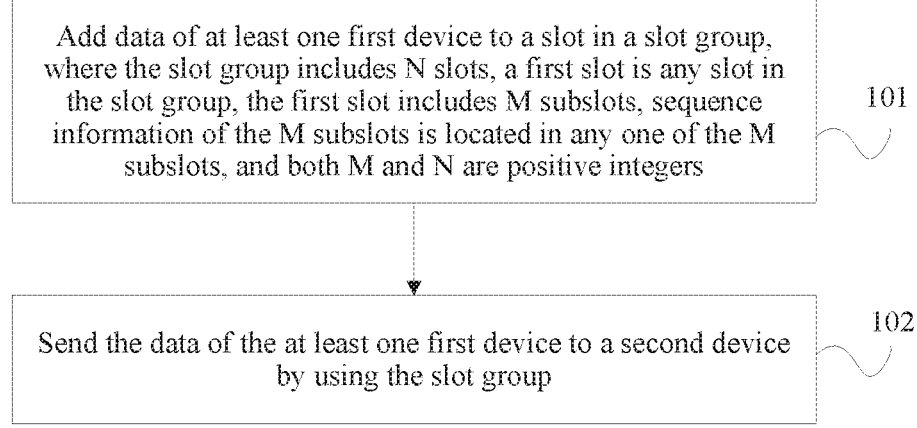
FIG. 12 is a schematic flowchart of a data transmission method according to an embodiment of this application.

FIG. 12 is a schematic flowchart of a data transmission method according to an embodiment of this application. As shown in FIG. 12, the method is specifically as follows:

101. Add data of at least one first device to a slot in a slot group, where the slot group includes N slots, a first slot is any slot in the slot group, the first slot includes M subslots, sequence information of the M subslots is located in any one of the M subslots, and both M and N are positive integers.

In an optional implementation, a second slot is any slot in the slot group, the second slot includes Q subslots. Q is different from M, and Q is a positive integer; and sequence information of the Q subslots is located in any one of the Q subslots.

In an optional implementation, data of a same first device is located in different slots.

In an optional implementation, data of a same first device is located in different subslots of a same slot.

In an optional implementation, data of different first devices is located in different slots.

In an optional implementation, data of different first devices is located in different subslots of a same slot.

In an optional implementation, the sequence information represents a rank of a subslot that carries the sequence information in a slot.

In an optional implementation, rates of subslots belonging to a same slot are different or the same.

In this embodiment, description is provided by using an example in which an entity for executing this embodiment is a third device. The first device is a device that needs to send data. To be specific, data that needs to be sent by the first device is data of a FlexE client. The third device needs to send the data of the first device. The third device may first complete clock adaptation between the FlexE client and a FlexE shim or clock adaptation between the FlexE client and a switching network by using an idle insert/delete module.

Then, the third device performs slot division. One slot group includes N slots. The first slot is any slot in the slot group. The first slot includes the M subslots. In other words, the first slot is divided into the M subslots. Then, the third device places the sequence information of the M subslots of the first slot in any one of the M subslots.

The sequence information of the M subslots represents a rank of the subslot that carries the sequence information in the slot. For example, a slot 1 includes five subslots: a subslot 1, a subslot 2, a subslot 3, a subslot 4, and a subslot 5. Sequence information of the five subslots is placed in the subslot 2. In this case, the sequence information represents that the subslot 2 is the second subslot of the slot 1, and a position of the subslot 2 can be further determined. Subslot positions are arranged in sequence, and therefore after the position of the subslot 2 is determined, it can be determined that a previously received subslot is the subslot 1 of the slot 1, and subsequently received subslots are the subslot 3, the subslot 4, and the subslot 5 of the slot 1.

Then, the third device adds data of different FlexE clients to the slot in the slot group based on a correspondence between a FlexE client and a slot. The correspondence includes the correspondence between a FlexE client and a slot and a correspondence between a FlexE client and a subslot.

There are the following several implementations for dividing the slot in the slot group into subslots:

In a first implementation, slot division may be performed on one slot in the slot group to divide the slot into M subslots. Bandwidths of the subslots of the slot may be different, and therefore rates of the subslots of the slot are different. Alternatively, bandwidths of the subslots of the slot may be the same, and therefore rates of the subslots of the slot are the same. Alternatively, slot division is performed on a plurality of slots in the slot group to divide each of the plurality of slots into M subslots. For each of the plurality of slots, bandwidths of the subslots of the slot may be different, and therefore rates of the subslots of the slot are different; or bandwidths of the subslots of the slot may be the same, and therefore rates of the subslots of the slot are the same.

Figure 13:
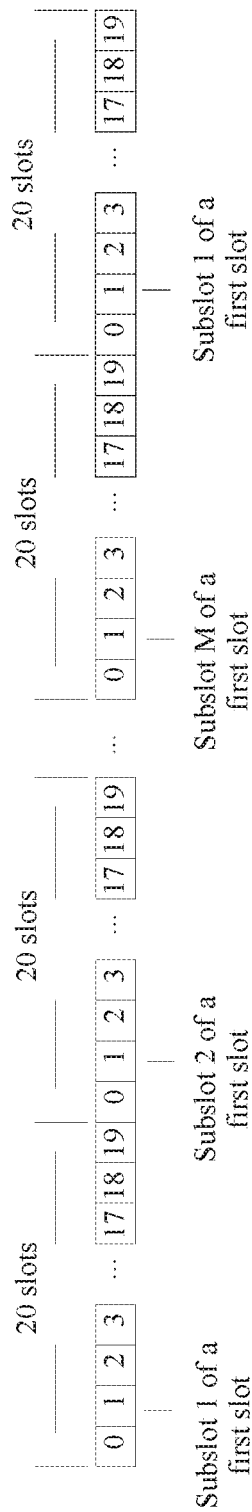
FIG. 13 is a schematic diagram 1 of a slot in a data transmission method according to an embodiment of this application.

FIG. 13 is a schematic diagram 1 of a slot in a data transmission method according to an embodiment of this application. As shown in FIG. 13, 20 slots constitute one slot group. The slot group includes a first slot slot 1. The first slot slot 1 includes M subslots. Sequence information of the M subslots of the first slot slot 1 is set in any one of the M subslots. In addition, the sequence information represents a rank of the subslot that carries the sequence information in the first slot slot 1.

There are the following several manners for adding the data of the at least one first device to the slot in the slot group, in other words, for placing data of at least one FlexE client in the slot in the slot group. In a first manner, data of a same first device may be added to different slots. For example, data 1 of a FlexE client 1 is placed in a slot 0 in the slot group, data 2 of the FlexE client 1 is placed in several subslots of the first slot slot 1 in the slot group, and data 3 of the FlexE client 1 is placed in a slot 2 in the slot group. In a second manner, data of a same first device may be added to different subslots of a same slot. For example, data of a same FlexE client may be placed in subslots of the first slot slot 1. For example, data 1 of a FlexE client 1 is added to a subslot 1 of the slot 1, data 2 of the FlexE client 1 is added to a subslot 2 of the slot 1, and data 3 of the FlexE client 1 is added to a subslot 3 of the slot 1. In a third manner, data of different first devices is added to different slots. Specifically, data of several FlexE clients is respectively added to several subslots of the slot 1, and data of another FlexE client is added to another slot in the slot group. For example, data of a FlexE client 1 may be added to a slot 0, data of a FlexE client 2 may be added to a subslot of the slot 1, and data of a FlexE client 3 may be added to a slot 2. In a fourth manner, data of different first devices is added to different subslots of a same slot. Specifically data of different FlexE clients may be placed in subslots of the first slot slot 1. For example, data of a FlexE client 1 is added to a subslot 1 of the slot 1, data of a FlexE client 2 is added to a subslot 2 of the slot 1, and data of a FlexE client 3 is added to a subslot 3 of the slot 1. For the example in FIG. 13, when the first slot slot 1 is divided, the first slot slot 1 may be evenly divided into the M subslots. In this case, bandwidths of the subslots of the first slot slot 1 are the same, in other words, rates of the subslots of the first slot slot 1 are the same, and a rate carried in each subslot is $(1/M)*5G$. The other 19 slots in the slot group are not divided, and a minimum granularity is still 5G. Alternatively, when the first slot slot 1 is divided, the first slot slot 1 may be unevenly divided into the M subslots. In this case, bandwidths of the subslots of the first slot slot 1 are different, in other words, rates of the subslots of the first slot slot 1 are different.

When slot division is performed on the plurality of slots in the slot group to divide each of the plurality of slots into the M subslots, for each of the plurality of slots, reference can be made to the method provided in FIG. 13.

Based on the technical solution in the first implementation, in the 20 slots, data of different FlexE clients may be added to the 20 slots. Rates of the different FlexE clients may be different. In this case, data of FlexE clients with different rates is added to the 20 slots in a hybrid manner.

In a second implementation, the first slot is any slot in the slot group, the first slot is divided into the M subslots, and the sequence information of the M subslots is located in any one of the M subslots. In addition, the second slot is any slot in the slot group, the second slot is divided into the Q subslots, and values of Q and M are different. Therefore, when slots in the slot group are divided into subslots, different slots may be divided into different quantities of subslots. For example, when four slots in the slot group are divided, a slot 1 is divided into M subslots, a slot 2 is divided into M subslots, a slot 3 is divided into Q subslots, and a slot 4 is divided into Q subslots, where values of Q and M are different. In addition, for the first slot and the second slot, bandwidths of subslots of a single slot may be different, and therefore rates of the subslots of the single slot are different; or bandwidths of subslots of a single slot may be the same, and therefore rates of the subslots of the single slot are the same.

Figure 14:
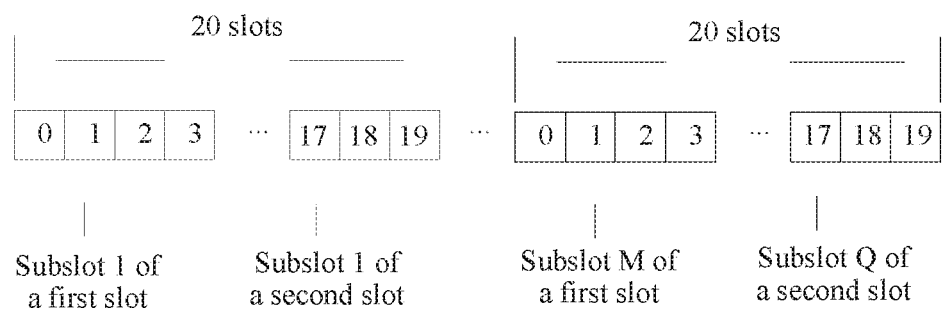
FIG. 14 is a schematic diagram 2 of a slot in a data transmission method according to an embodiment of this application.

FIG. 14 is a schematic diagram 2 of a slot in a data transmission method according to an embodiment of this application. As shown in FIG. 14, 20 slots constitute one slot group. The slot group includes a first slot slot 1. The first slot slot 1 includes M subslots. Sequence information of the M subslots of the first slot slot 1 is set in any one of the M subslots. In addition, the sequence information represents a rank of the subslot that carries the sequence information in the first slot slot 1. The slot group includes a second slot slot 17. The second slot slot 17 includes Q subslots. Sequence information of the Q subslots of the second slot slot 17 is set in any one of the Q subslots. In addition, the sequence information represents a rank of the subslot that carries the sequence information in the second slot slot 17.

There are the following several manners for adding the data of the at least one first device to the slot in the slot group, in other words, for placing data of at least one FlexE client in the slot in the slot group. In a first manner, data of a same first device may be added to different slots. For example, data 1 of a FlexE client 1 is placed in a slot 0 in the slot group, data 2 of the FlexE client 1 is placed in several subslots of the first slot slot 1 in the slot group, data 3 of the FlexE client 1 is placed in a slot 2 in the slot group, and by analogy, data 17 of the FlexE client 1 is placed in several subslots of the second slot slot 17 in the slot group. In a second manner, data of a same first device may be added to different subslots of a same slot. For example, data of a same FlexE client may be placed in subslots of the first slot slot 1. For example, data 1 of a FlexE client 1 is added to a subslot 1 of the slot 1, data 2 of the FlexE client 1 is added to a subslot 2 of the slot 1, and data 3 of the FlexE client 1 is added to a subslot 3 of the slot 1; and data 1 of a FlexE client 2 is added to a subslot 1 of the second slot slot 17, data 2 of the FlexE client 2 is added to a subslot 2 of the second slot slot 17, and data 3 of the FlexE client 2 is added to a subslot 3 of the second slot slot 17. In a third manner, data of different first devices is added to different slots. Specifically, data of several FlexE clients is respectively added to several subslots of the first slot slot 1 or several slots of the second slot slot 17, and data of another FlexE client is added to another slot in the slot group. For example, data of a FlexE client 1 may be added to a slot 0, data of a FlexE client 2 may be added to a subslot of the first slot slot 1, data of a FlexE client 3 may be added to a slot 2, and data of a FlexE client 4 may be added to a subslot of the second slot slot 17. In a fourth manner, data of different first devices is added to different subslots of a same slot. Specifically, data of different FlexE clients may be placed in subslots of the first slot slot 1 or subslots of the second slot slot 17. For example, data of a FlexE client 1 is added to a subslot 1 of the first slot slot 1, data of a FlexE client 2 is added to a subslot 2 of the first slot slot 1, and data of a FlexE client 3 is added to a subslot 3 of the first slot slot 1; or data of a FlexE client 1 is added to a subslot 1 of the second slot slot 17, data of a FlexE client 2 is added to a subslot 2 of the second slot slot 17, and data of a FlexE client 3 is added to a subslot 3 of the second slot slot 17. For the example in FIG. 14, when the first slot slot 1 is divided, the first slot slot 1 may be evenly divided into the M subslots. In this case, bandwidths of the subslots of the first slot slot 1 are the same, in other words, rates of the subslots of the first slot slot 1 are the same, and a rate carried in each subslot is (1/M)*5G. Alternatively, when the first slot slot 1 is divided, the first slot slot 1 may be unevenly divided into the M subslots. In this case, bandwidths of the subslots of the first slot slot 1 are different, in other words, rates of the subslots of the first slot slot 1 are different. When the second slot slot 17 is divided, the second slot slot 17 may be evenly divided into the Q subslots. In this case, bandwidths of the subslots of the second slot slot 17 are the same, in other words, rates of the subslots of the second slot slot 17 are the same, and a rate carried in each subslot is (1/Q)*5G. Alternatively, when the second slot slot 17 is divided, the second slot slot 17 may be unevenly divided into the Q subslots. In this case, bandwidths of the subslots of the second slot slot 17 are different, in other words, rates of the subslots of the second slot slot 17 are different. For example, the first slot slot 1 is divided into five subslots, and a rate of each subslot is 1G: the second slot slot 17 is divided into two subslots, and a rate of each subslot is 2.5G: and the other 18 slots are not divided, and a minimum granularity is still 5G.

Figure 15:
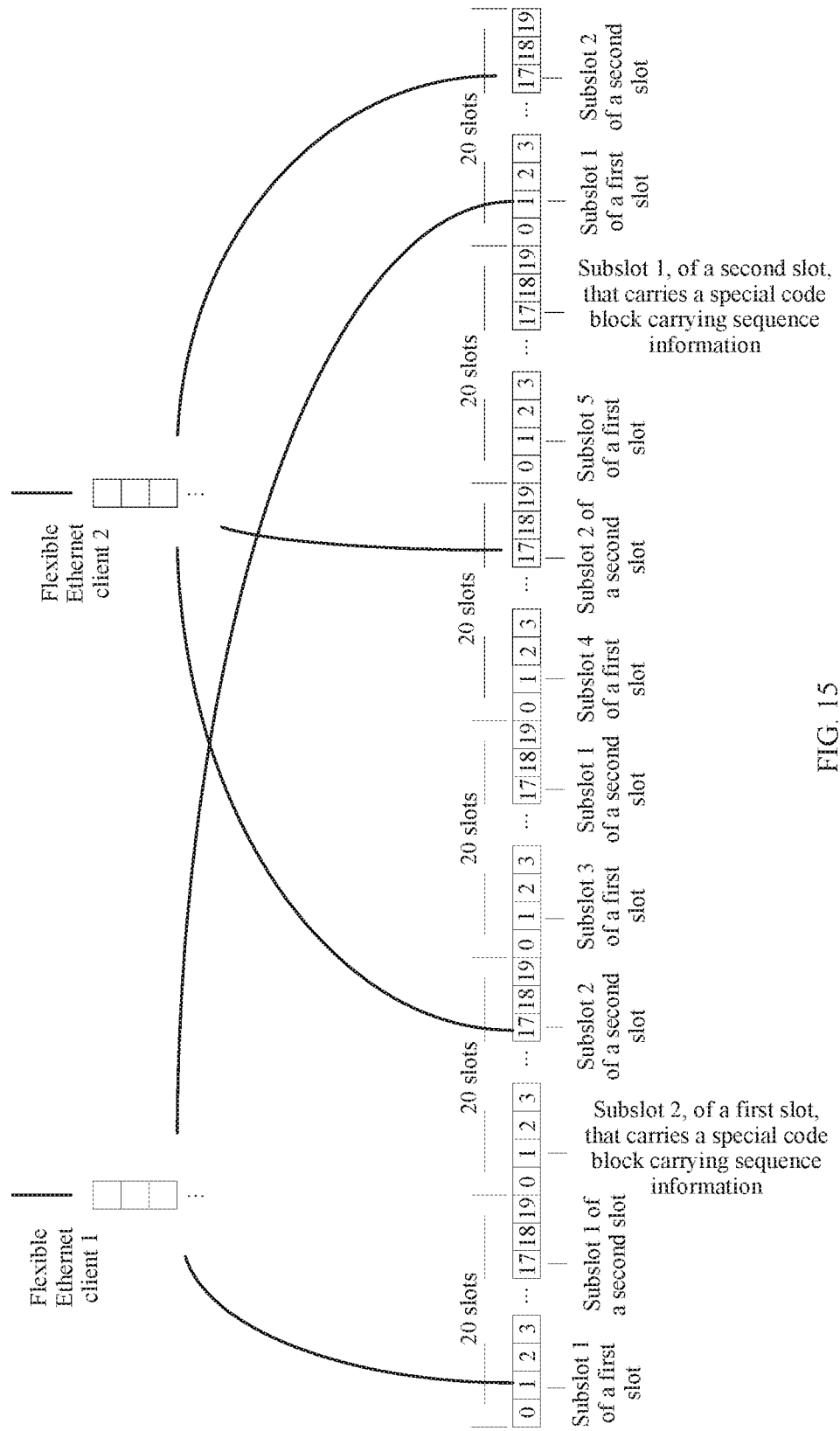
FIG. 15 is a schematic diagram 3 of a slot in a data transmission method according to an embodiment of this application.

For example, FIG. 15 is a schematic diagram 3 of a slot in a data transmission method according to an embodiment of this application. As shown in FIG. 15, the first slot slot 1 is divided into five subslots, a subslot 1 is used to carry data of a FlexE client 1 with a 1G rate, and a subslot 2 carries sequence information of the five subslots; and the second slot slot 17 is divided into two subslots, a subslot 1 is used to carry data of a FlexE client 2 with a 2.5G rate, and the subslot 1 carries sequence information of the two subslots. The sequence information is a special code block. FIG. 16 is a diagram of a format definition of a special code block in a data transmission method according to an embodiment of this application. As shown in FIG. 16, sync represents a 64B/66B encoded synchronization header; 8:'b1 indicates that slot information of 20 slots is carried, and 1'b0 indicates that slot information of a single slot is carried: 9-12 indicate a slot division type, where 0×0 indicates that no division is performed, 0×1 indicates division into two equal parts, 0×2 indicates division into three equal parts, . . . , and 0×f indicates division into 16 equal parts; 13-16 indicate a slot position of the slot, where 0×0 indicates a slot 1, 0×1 indicates a slot 2, . . . , and 0×f indicates a slot f+1; 17-24 are used for subslot link establishment negotiation; and a special digit X is used for distinguishing from another control code block, and is used to indicate that a current control code block is a special code block that carries the sequence information.

Similarly, based on the technical solution in the second implementation, in the 20 slots, data of different FlexE clients may be added to the 20 slots. Rates of the different FlexE clients may be different. In this case, data of FlexE clients with different rates is added to the 20 slots in a hybrid manner.

Further, based on the foregoing process, in a data sending direction, the third device encapsulates the data of the FlexE client into the slot group, and in a data receiving direction, the third device may parse the slot group to obtain a 20-slot data structure.

102. Send the data of the at least one first device to a second device by using the slot group.

In this embodiment, in the data sending direction, the third device sends, to the second device, the slot group that carries the data of the FlexE client. Further, the third device sends the data of the first device and the sequence information of the M subslots to the second device. In addition, the third device may send the correspondence between a FlexE client and a slot to the second device in the sending direction. Alternatively, in the data receiving direction, the third device sends, to a client scheduling module of the third device, the slot group that carries the data of the FlexE client.

For a process of transmitting the slot group, there are the following several implementation scenarios.

In a first implementation scenario, based on the scenario shown in FIG. 10, data is transmitted between FlexE interface boards. When step 101 and step 102 are being implemented, in a first step, a FlexE interface board 04 connects a low-rate FlexE client A to a low-rate FlexE client N and the FlexE interface board 04. In a second step, the FlexE interface board 04 completes clock adaptation between each FlexE client and a FlexE shim by using the idle insert/delete module. In a third step, the FlexE interface board 04 establishes a link. An interface between the client scheduling module and the FlexE shim is based on the 20 slots in the slot group, that is, 20 64B/66B blocks sent to the FlexE shim in a unit time period are exactly 20 slots in a FlexE frame structure. In this case, when the link starts to be established, an idle code block in the slot group may be used. The idle code block is replaced with a special code block that carries the sequence information of the subslots. After the link is established, a special code block that carries sequence information of corresponding subslots is periodically or aperiodically inserted into the slot group as required. In a fourth step, a client scheduling module of the FlexE interface board 04 reads data of each FlexE client based on a client slot allocation relationship, and then places the data in a corresponding slot, where the client slot allocation relationship is the correspondence between a FlexE client and a slot. In a fifth step, the FlexE interface board 04 encapsulates the slot group into a structure of a standard FlexE frame, and transmits the standard FlexE frame to a FlexE interface board 05. In a sixth step, the FlexE interface board 05 parses the standard FlexE frame into 20 slots, and then sends the 20 slots obtained through parsing to a client scheduling module of the FlexE interface board 05. A physical channel connecting FlexE interfaces may be an optical channel, or may be an electrical channel.

Figure 17:
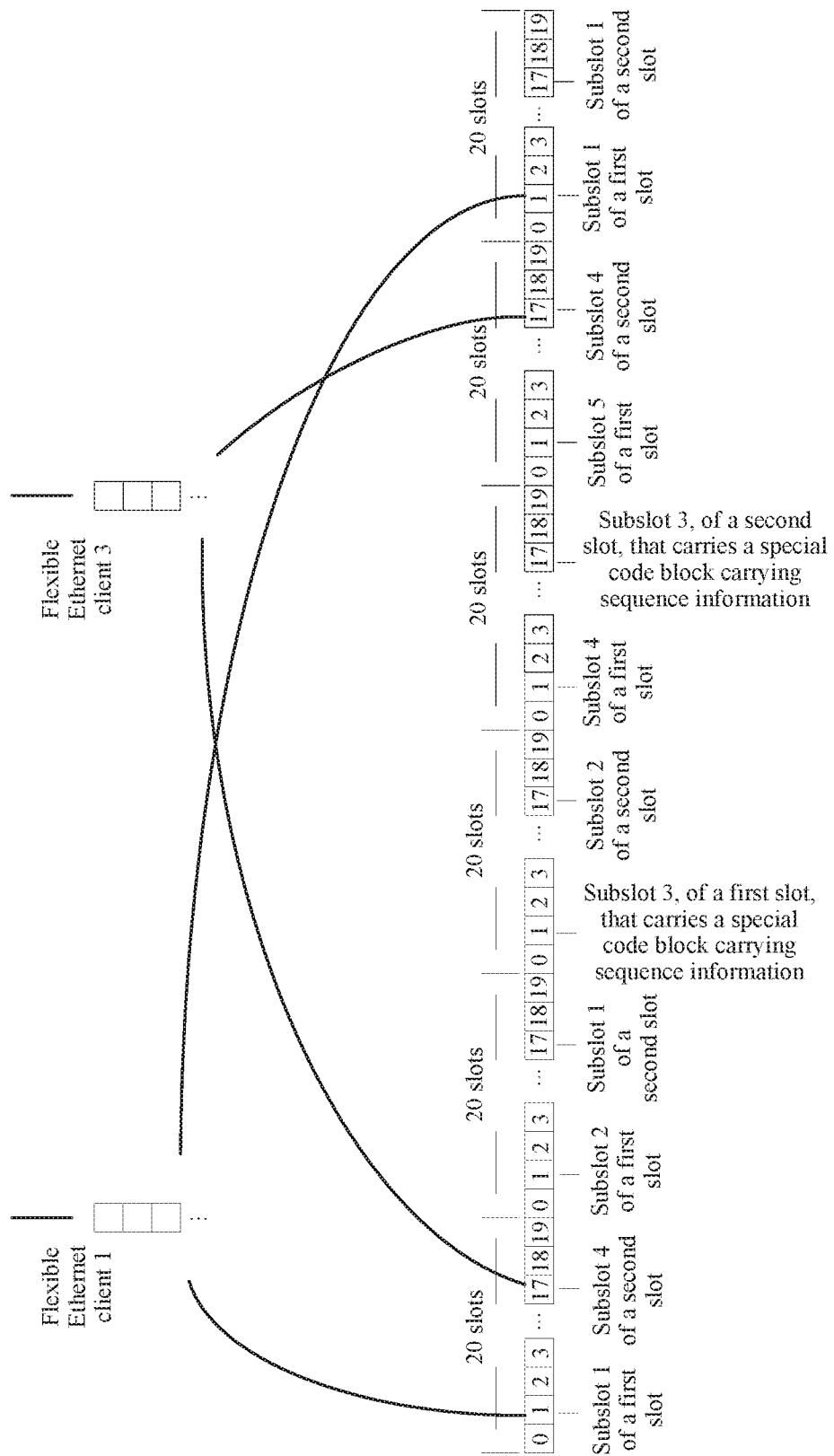
FIG. 17 is a schematic diagram 4 of a slot in a data transmission method according to an embodiment of this application.

For example, when the slot group shown in FIG. 15 is being transmitted, the third device first replaces idle code blocks in the first slot slot 1 and the second slot slot 17 with a special code block that carries the sequence information. The third device further needs to periodically transfer the special code block that carries the sequence information, so that the second device can check targeted sequence information. Then, the third device adds the data of the FlexE client 1 to the subslot 1 of the first slot slot 1, and adds the data of the FlexE client 2 to the subslot 2 of the second slot slot 17. Then, when the second device restores the 64B/66B blocks corresponding to the 20 slots in the slot group, the second device may restore the data of the FlexE client 1 and the data of the FlexE client 2 based on the targeted sequence information and the correspondence between a FlexE client and a slot. Then, FIG. 17 is a schematic diagram 4 of a slot in a data transmission method according to an embodiment of this application. As shown in FIG. 17, when link transmission of the FlexE client 2 terminates, and the data of the FlexE client 3 with a 1.25G rate needs to be transmitted by using the second slot slot 17, the data of the FlexE client 3 is added to a subslot 4 of the second slot slot 17. In this case, a process of sending the slot group is as follows: First, the third device redivides the second slot slot 17 into subslots; then, the third device sends new subslot information to the second device; then, the third device adds the data of the FlexE client 3 to the subslot 4 of the second slot slot 17, and the third device sends the slot group to the second device; and when the second device receives data carried in the second slot slot 17, the second device restores the data of the FlexE client 3 based on sequence information of targeted subslots and a new correspondence between a FlexE client and a slot.

Figure 18A:
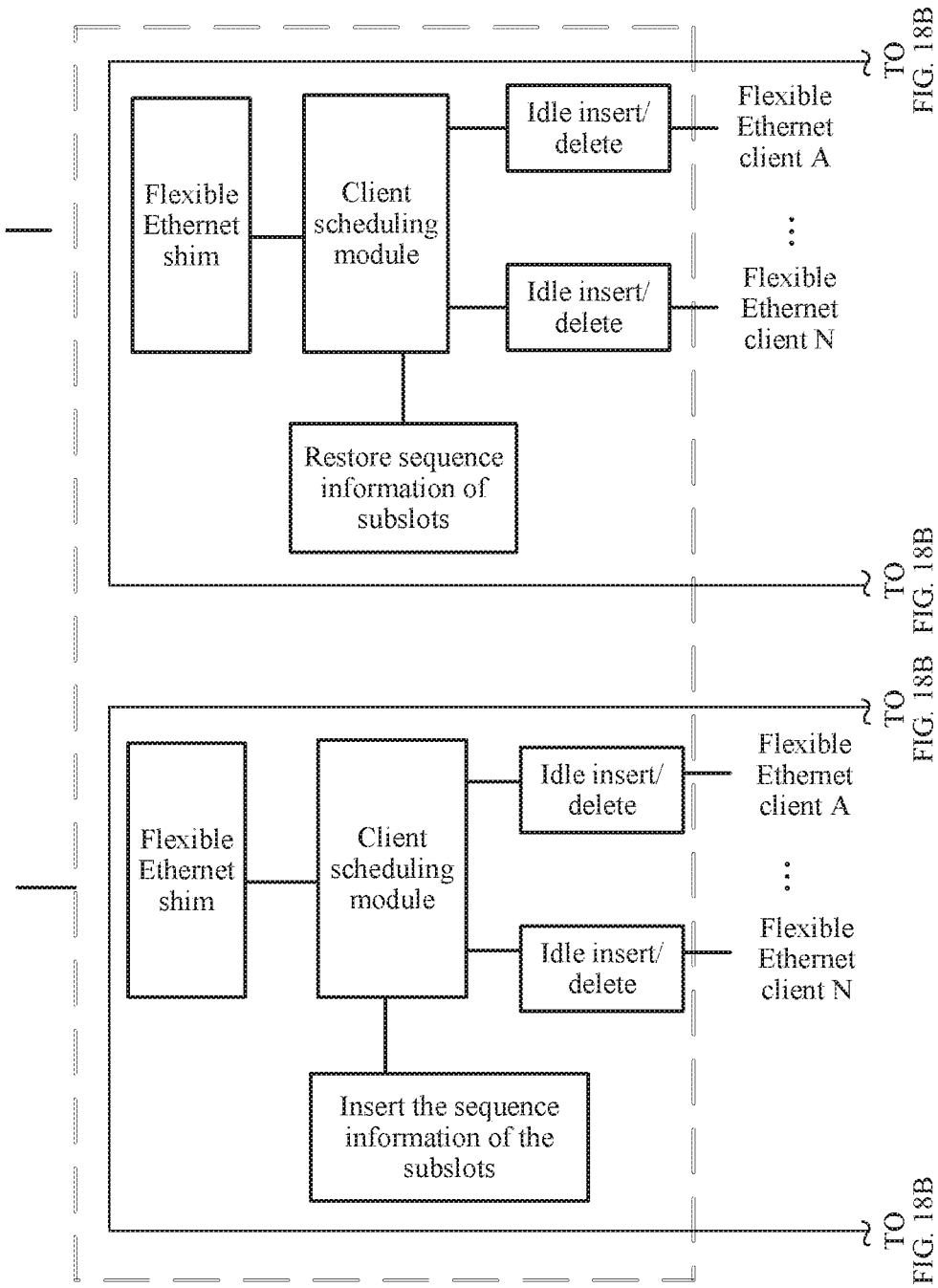
FIG. 18A and FIG. 18B are a schematic diagram 3 of an application scenario according to an embodiment of this application.
Figure 18B:
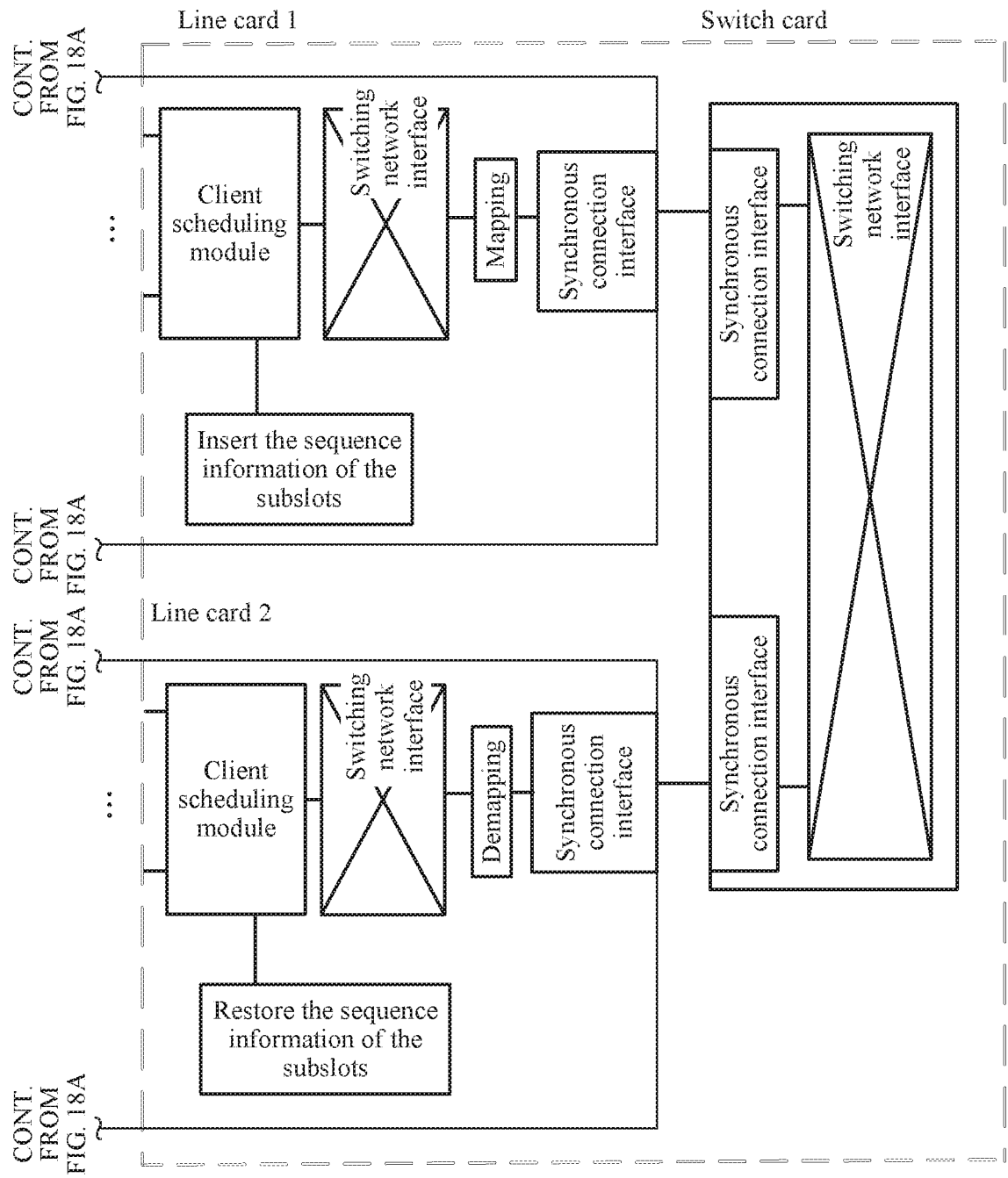

In a second implementation scenario, based on the scenario shown in FIG. 11A, FIG. 11B, and FIG. 11C, a data stream is transmitted on a device in a large-scale FlexE-based synchronous switching network. FIG. 18A and FIG. 18B are a schematic diagram 3 of an application scenario according to an embodiment of this application. In an architecture shown in FIG. 18A and FIG. 18B, the scenario shown in FIG. 18A and FIG. 18B is the same as the scenario shown in FIG. 1A, FIG. 11B, and FIG. 11C. When step 101 and step 102 are being implemented, a line card 1 serves as the third device. In a first step, the line card 1 restores data of a low-rate FlexE client A to a low-rate FlexE client N from a FlexE shim. In a second step, an interface between a client scheduling module of the line card 1 and the switching network is based on 20 slots. When a link starts to be established, the line card 1 first uses an idle code block, and replaces the idle code with a special code block that carries sequence information of corresponding subslots. Then, after the link is established, the line card 1 periodically or aperiodically inserts the special code block into the 20 slots as required. In a third step, the client scheduling module of the line card 1 reads data of each FlexE client, and then the line card 1 adds the data of each FlexE client to each slot based on the correspondence between a FlexE client and a slot. In a fourth step, a switching network interface of the line card 1 sends, to a corresponding synchronous connection interface based on a preset configuration relationship over a switching network based on a slot granularity, the data sent by the client scheduling module. In a fifth step, the synchronous connection interface of the line card 1 encapsulates the data with the slot granularity into a unit slot corresponding to the synchronous connection interface for carrying. The synchronous connection interface is configured to send the data from the line card 1 to the second device, namely, a switch card, so that the data can be sent to the second device, namely, the switch card, in the fifth step. The synchronous connection interface may be a FlexE interface, or may be a non-FlexE interface. If the synchronous connection interface is a FlexE interface, the fifth step does not need to be performed.

In this embodiment, the data of the at least one first device is added to the slot in the slot group, where the slot group includes the N slots, the first slot is any slot in the slot group, the first slot includes the M subslots, the sequence information of the M subslots is located in any one of the M subslots, and both M and N are positive integers; and the data of the at least one first device is sent to the second device by using the slot group. Sequence information of subslots of a slot is placed in any subslot of the slot, instead of being placed in an overhead frame, and therefore a receive end can learn of information about a sequence relationship in a relatively short time, reducing a time interval. Further, the receive end learns of the sequence information of the subslots in a relatively short time, and therefore when the receive end restores data in a slot group based on the information about the sequence relationship, a restoration time is shortened. This facilitates fast link establishment, link detection, and dynamic rate switching. Because the sequence information of the subslots is added to the slot in the slot group, the sequence information of the subslots can be transparently transmitted in a large-scale synchronous switching network that is based on a FlexE interface. In addition, the sequence information of the subslots can be transparently transmitted in a synchronous switching network that is based on a non-FlexE interface, so that a device in the synchronous switching network that is based on the non-FlexE interface can obtain the sequence information of the subslots, and then can determine a sequence of the subslots in the slot based on the sequence information of the subslots, to facilitate slot parsing. Furthermore, different slots in the slot group include different quantities of subslots. Therefore, rates of different slots in the slot group are different. In this case, when data is added to different slots, data of FlexE clients with different rates may be placed in different slots, so that data with different rates can be transmitted in one slot group, in other words, slots with hybrid rates can be transmitted, and data of FlexE clients with different rates can be added to one slot group in a hybrid manner. In this application, a single slot is divided, and therefore when a slot is redivided into subslots, another slot is not interfered with.

Figure 19:
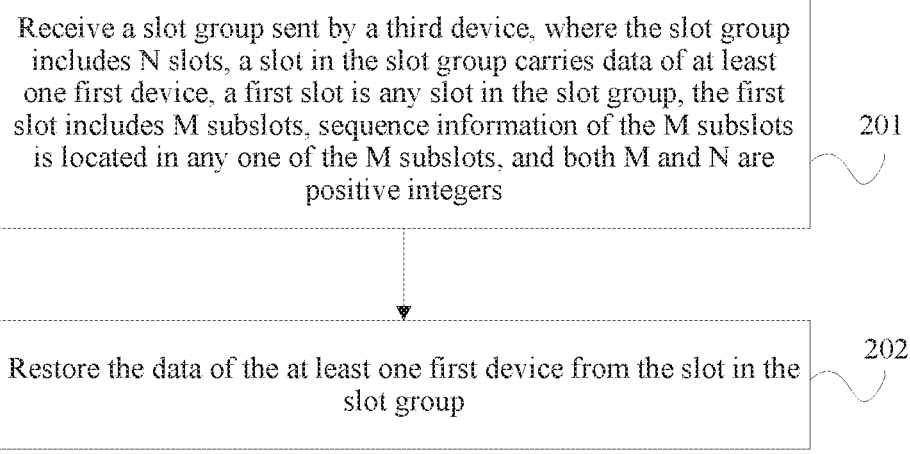
FIG. 19 is a schematic flowchart of another data transmission method according to an embodiment of this application.

FIG. 19 is a schematic flowchart of another data transmission method according to an embodiment of this application. As shown in FIG. 19, the method is specifically as follows:

201. Receive a slot group sent by a third device, where the slot group includes N slots, a slot in the slot group carries data of at least one first device, a first slot is any slot in the slot group, the first slot includes M subslots, sequence information of the M subslots is located in any one of the M subslots, and both M and N are positive integers.

In an optional implementation, a second slot is any slot in the slot group, the second slot includes Q subslots, Q is different from M, and Q is a positive integer; and sequence information of the Q subslots is located in any one of the Q subslots.

In an optional implementation, data of a same first device is located in different slots.

In an optional implementation, data of a same first device is located in different subslots of a same slot.

In an optional implementation, data of different first devices is located in different slots.

In an optional implementation, data of different first devices is located in different subslots of a same slot.

In an optional implementation, the sequence information represents a rank of a subslot that carries the sequence information in a slot.

In an optional implementation, rates of subslots belonging to a same slot are different or the same.

In this embodiment, description is provided by using an example in which an entity for executing this embodiment is a second device. The second device receives the data sent by the third device that is the entity for executing the embodiment shown in FIG. 12. For example, a line card 1 serves as the third device, and the line card 1 sends the data of the first device to a line card 2. In this case, the line card 2 serves as the second device. The second device receives the slot group sent by the third device. Specifically, in a data sending direction, the third device sends, to the second device, the slot group that carries data of a FlexE client, and then the second device receives the slot group sent by the third device. Alternatively, in a data receiving direction, the third device sends, to a client scheduling module of the third device, the slot group that carries data of a FlexE client. In this case, the third device is the second device.

For a manner of dividing a single slot in the slot group into subslots and a manner of carrying the data of the first device by a single slot, refer to the method in the embodiment provided in FIG. 11A, FIG. 11B, and FIG. 11C. Details are not described herein again.

202. Restore the data of the at least one first device from the slot in the slot group.

In this embodiment, the second device parses the slot group to obtain data of each first device. Specifically, in the data sending direction, the third device sends, to the second device, the slot group that carries the data of the FlexE client, and then the second device receives the slot group sent by the third device: and then the second device may parse the slot group. Alternatively, in the data receiving direction, the third device sends, to the client scheduling module of the third device, the slot group that carries the data of the FlexE client; and then the third device parses the slot group. In the data receiving direction, the third device restores data of each FlexE client from a 20-slot data structure transmitted from a calendar module of the third device. In this case, the third device is the second device.

For a process of restoring the data in the slot group, there are the following several implementation scenarios.

In a first implementation scenario, based on the scenario shown in FIG. 10, data is transmitted between FlexE interface boards. In the first implementation scenario of the process of transmitting the slot group provided in the embodiment shown in FIG. 12, after the sixth step, in a seventh step, the FlexE interface board 05 serves as a second receiving device, and the FlexE interface board 05 identifies the sequence information of the subslots of the slot in the 20 slots in the slot group, in other words, identifies the special code block that carries the sequence information of the subslots. In an eighth step, the FlexE interface board 05 restores the data of each FlexE client from the slot in the slot group and a subslot of the slot based on the correspondence between a FlexE client and a slot. In a ninth step, the FlexE interface board 05 completes clock adaptation between a FlexE client data stream and a client interface by using the idle insert/delete module: and then the FlexE interface board 05 obtains the data of each FlexE client.

In a second implementation scenario, based on the scenarios shown in FIG. 11A, FIG. 11B, FIG. 11C, FIG. 18A, and FIG. 18B, a data stream is transmitted on a device in a large-scale FlexE-based synchronous switching network. In the first implementation scenario of the process of transmitting the slot group provided in the embodiment shown in FIG. 12, after the fifth step, in a sixth step, the switch card restores the data sent by the line card 1, and sends the data to a switching network interface of the switch card. In a seventh step, the switching network interface of the switch card sends, to another synchronous connection interface based on preset configuration information, data transmitted by a synchronous connection interface. In an eighth step, the synchronous connection interface of the switch card sends the data sent from the switching network interface of the switch card to a line card 2. In a ninth step, the line card 2 receives the data sent by the switch card; then the line card 2 parses the data to restore the data carried in the unit slot; and then the line card 2 sends the data obtained through parsing to a demapping module of the line card 2. In a tenth step, the line card 2 parses the data carried in the unit slot into data with a slot granularity. In an eleventh step, a switching network interface of the line card 2 uses a switching network that is based on the slot granularity, and the switching network interface of the line card 2 sends the data with the slot granularity to a corresponding client scheduling module ingress based on the preset configuration information. In a twelfth step, a client scheduling module of the line card 2 obtains the data with the slot granularity from the client scheduling module ingress, and then the client scheduling module of the line card 2 identifies the special code block that carries the sequence information of the subslots, and further determines a position of a subslot of each slot in the slot group. In a thirteenth step, the line card 2 restores the data of each FlexE client from the slot in the slot group based on a preset correspondence between a FlexE client and a slot, to obtain the data of the low-rate FlexE client A to the low-rate FlexE client N.

Figure 20A:
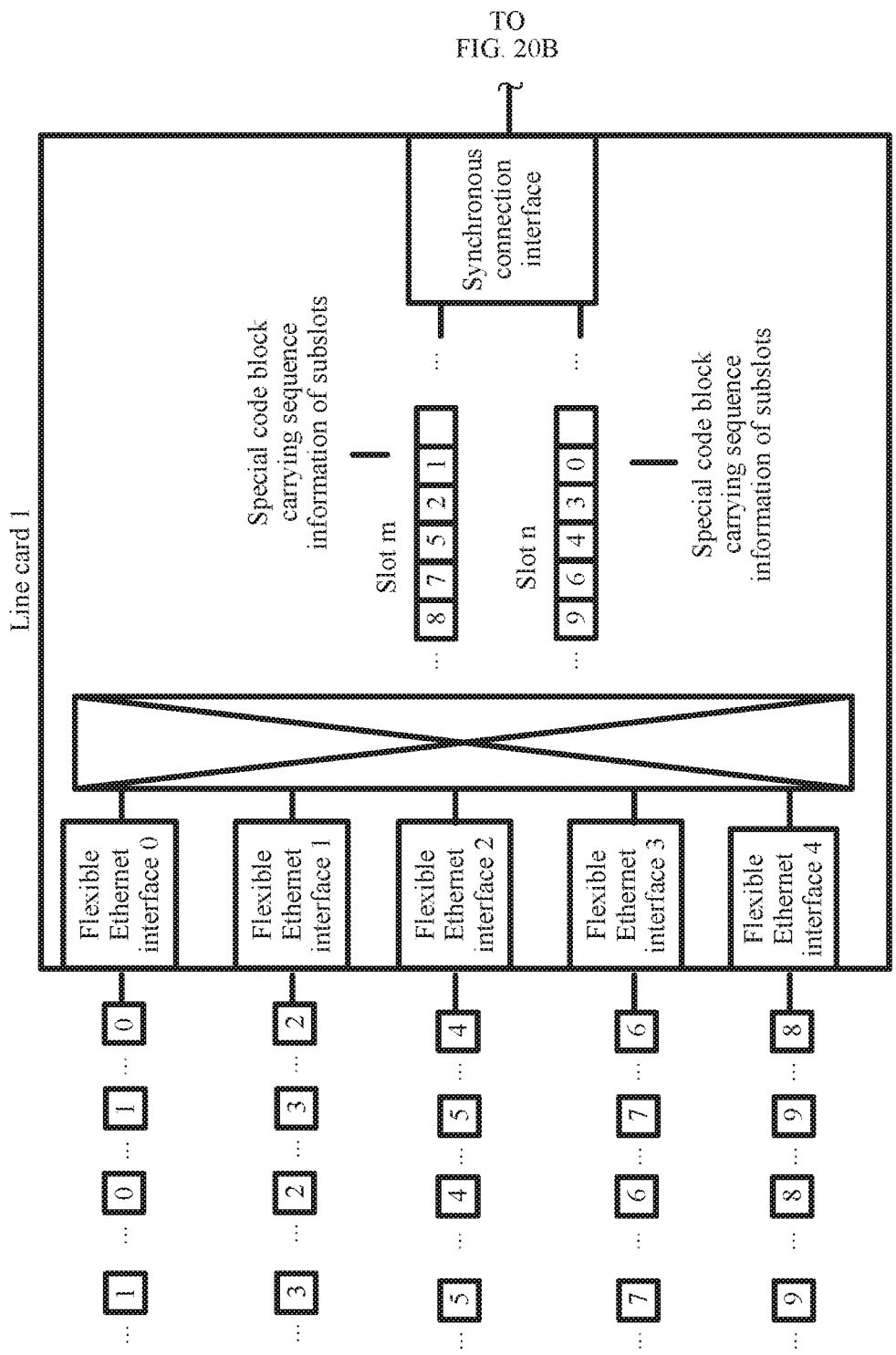
FIG. 20A, FIG. 20B.
Figure 20B:
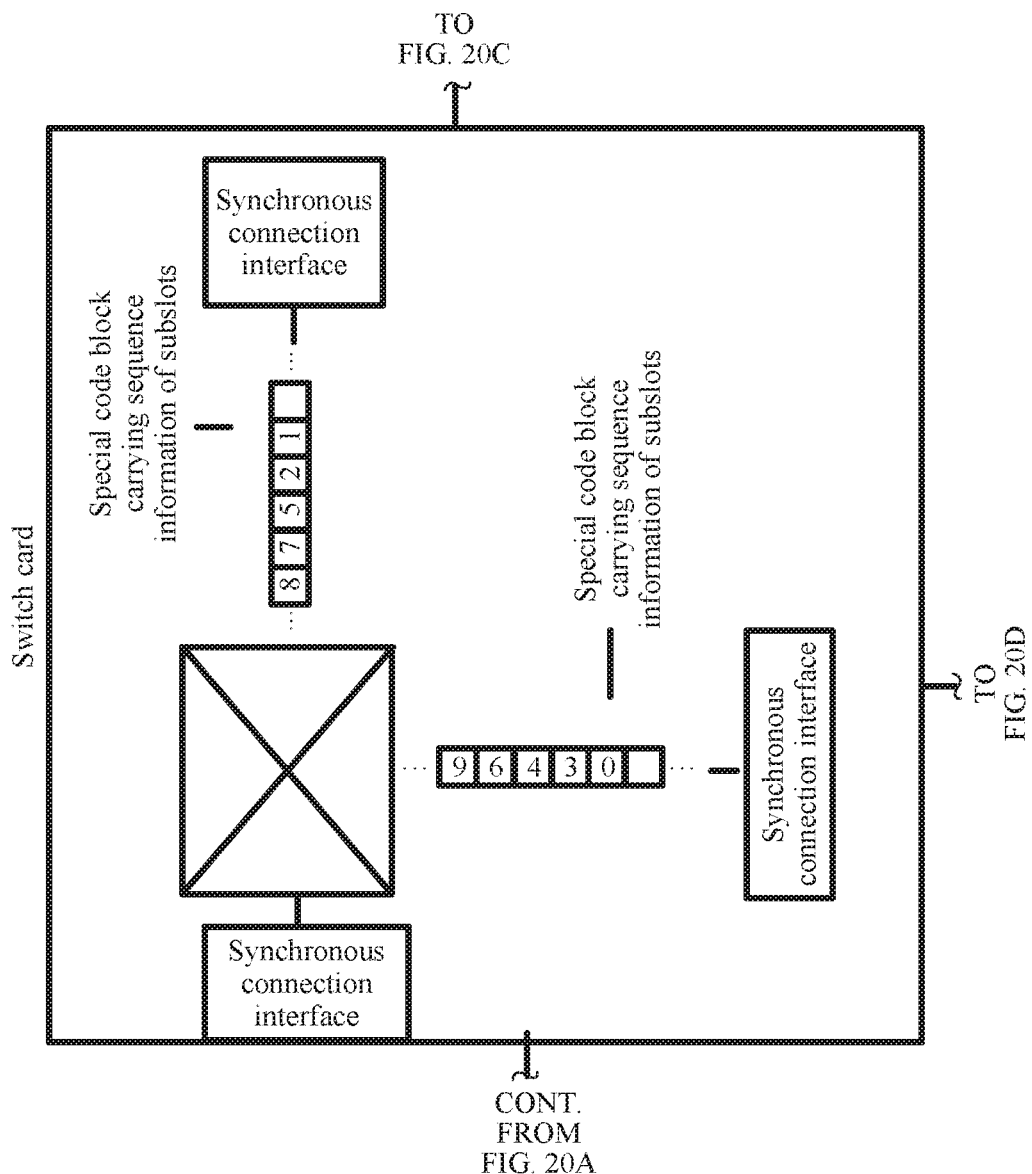
Figure 20C:
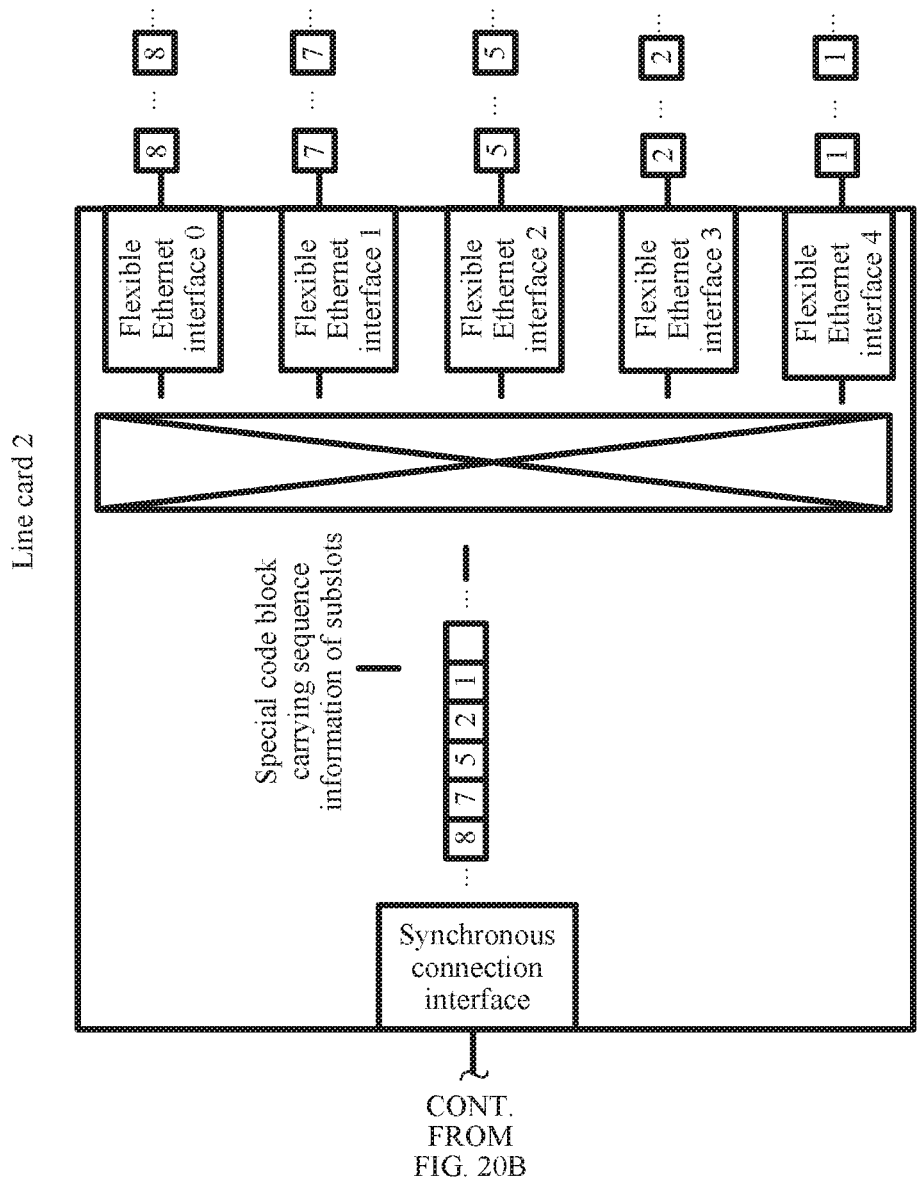
FIG. 20C, and FIG. 20D are a schematic diagram of data transmission in another data transmission method according to an embodiment of this application.
Figure 20D:
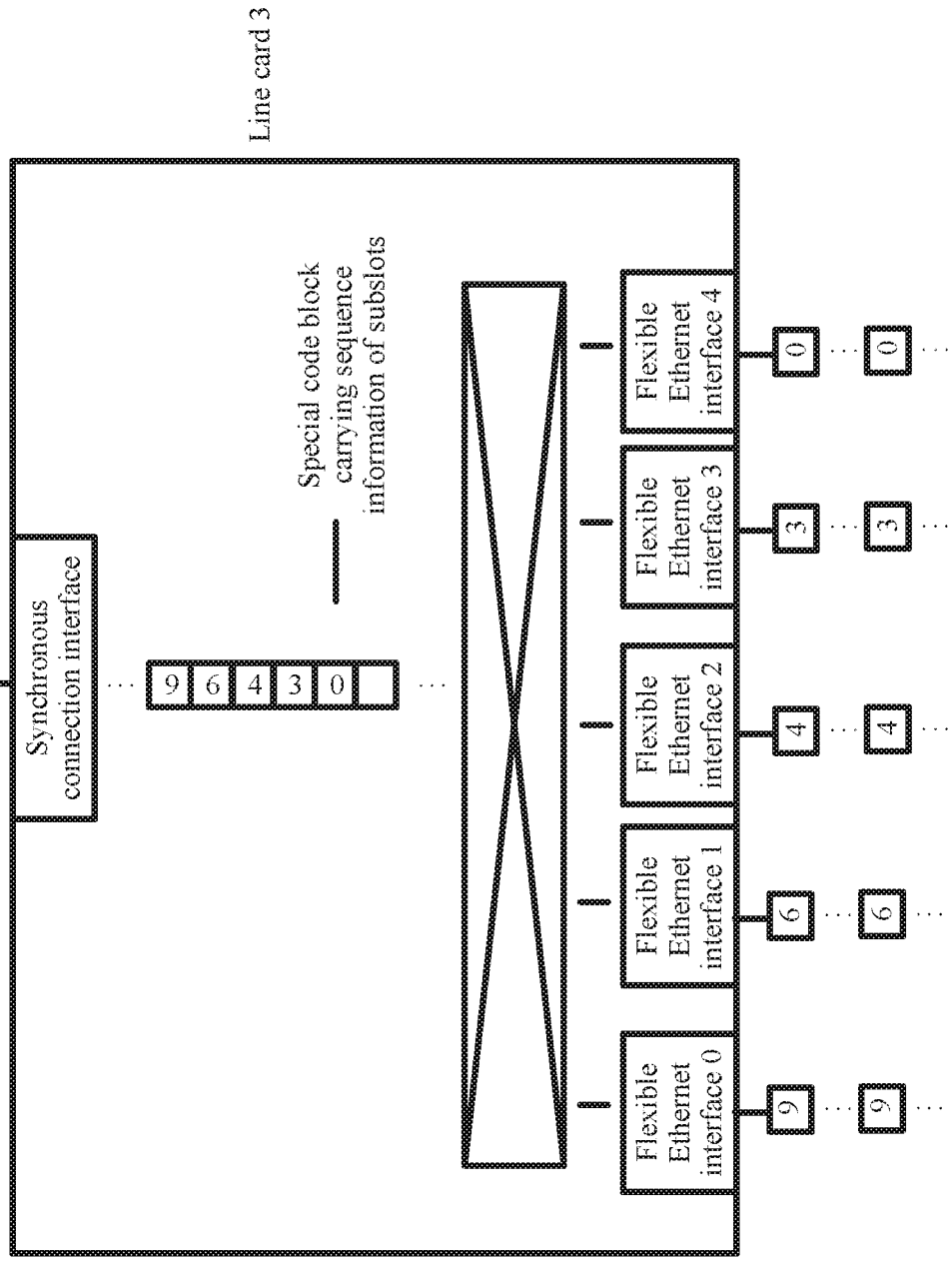

For example. FIG. 20A, FIG. 20B, FIG. 20C, and FIG. 20D are a schematic diagram of data transmission in another data transmission method according to an embodiment of this application. As shown in FIG. 20A. FIG. 20B. FIG. 20C, and FIG. 20D, the slot group that carries the sequence information of the subslots may be transparently transmitted by using a synchronous switching network. As shown in FIG. 20A, FIG. 20B, FIG. 20C, and FIG. 20D, 0-9 indicate subslots belonging to different slots, and a granularity of each subslot is 1G. Five FlexE interfaces of the line card 1 respectively carry data of five FlexE clients. Two slots carried by each FlexE interface need to be respectively transmitted to the line card 2 and a line card 3. To be specific, a slot slot m is transmitted to the line card 2, and a slot slot n is transmitted to the line card 3. A transmission process is as follows: In a first step, the subslots 1, 2, 5, 7, and 8 to be transmitted to the line card 2 are encapsulated in the slot m, and the subslots 0, 3, 4, 6, and 9 to be transmitted to the line card 3 are encapsulated in the other slot n. In a second step, for the slot m, sequence information of the subslots is placed in a subslot of the slot m; and for the slot n, sequence information of the subslots is placed in a subslot of the slot n. In a third step, the slot m is transmitted to the line card 2 and the slot n is transmitted to the line card 3 by using a slot-level synchronous switching network. In a fourth step, in the line card 2, the line card 2 transmits, through different FlexE interfaces based on a configuration relationship, the subslots 1, 2, 5, 7, and 8 carried in the slot m. In the line card 3, the line card 3 transmits, through different FlexE interfaces based on the configuration relationship, the subslots 0, 3, 4, 6, and 9 carried in the slot n.

In the foregoing process, the sequence information of the subslots is restored by using a mark of the sequence information of the subslots. Specifically, the sequence information of the subslots is transmitted by using the slot that carries the special code block, instead of being transmitted by using an overhead frame.

Figure 21:
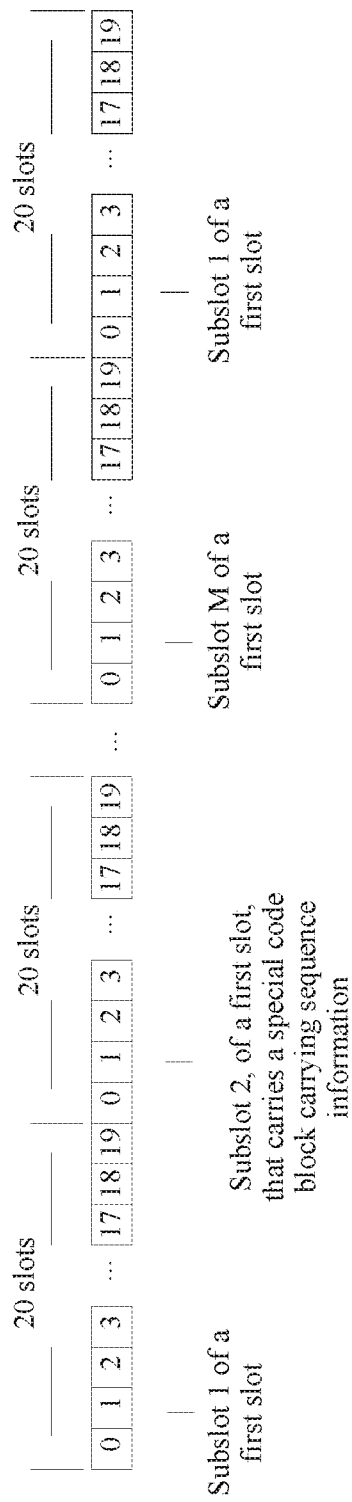
FIG. 21 is a schematic diagram 1 of a slot in another data transmission method according to an embodiment of this application.

For example, FIG. 21 is a schematic diagram 1 of a slot in another data transmission method according to an embodiment of this application. As shown in FIG. 21, a first slot slot 1 is divided into M subslots, sequence information of the M subslots is placed in a special code block, and the special code block is placed in a subslot 2 of the first slot slot 1. In this case, after receiving the slot group, the second device may determine, based on the sequence information of the M subslots in the special code block, that a subslot that carries the sequence information of the M subslots is the subslot 2. Subslot positions are arranged in sequence, and therefore after a position of a subslot is determined, positions of following subslots are determined. Then, a sequence and positions of the subslots in the first slot slot 1 may be determined.

Figure 22:
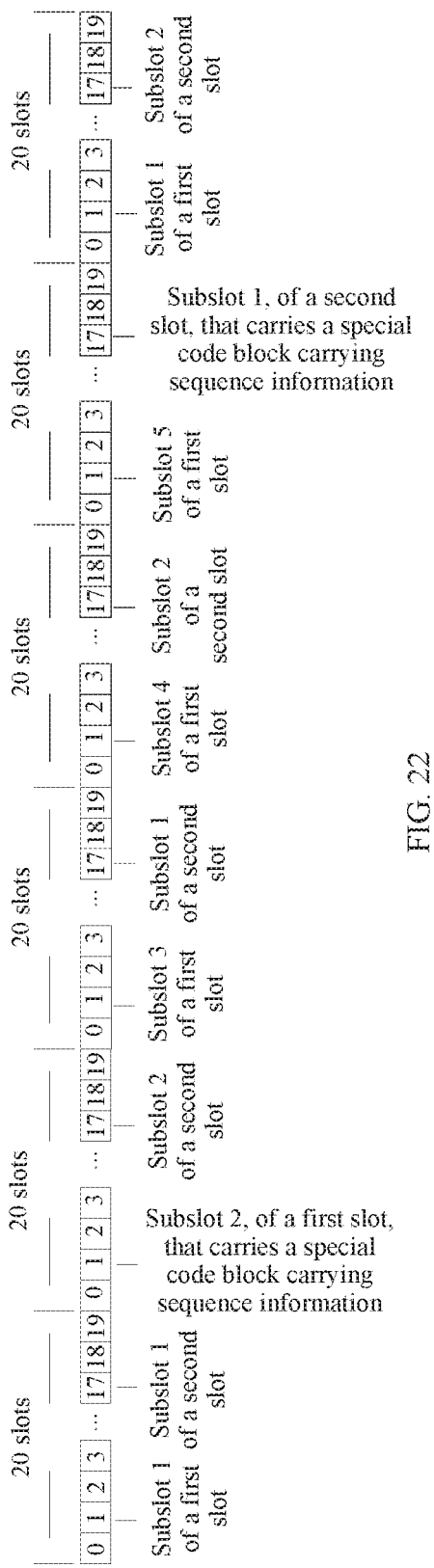
FIG. 22 is a schematic diagram 2 of a slot in another data transmission method according to an embodiment of this application.

For another example, FIG. 22 is a schematic diagram 2 of a slot in another data transmission method according to an embodiment of this application. As shown in FIG. 22, a first slot slot 1 is divided into five subslots, sequence information of the five subslots is placed in a special code block, and the special code block is placed in a subslot 2 of the first slot slot 1; and a second slot slot 17 is divided into two subslots, sequence information of the two subslots is placed in a special code block, and the special code block is placed in a subslot 1 of the second slot slot 17. In this case, after receiving the slot group, the second device may determine, based on the sequence information of the five subslots in the special code block in the first slot slot 1, that a subslot that carries the sequence information of the five subslots is the subslot 2, and then may determine a sequence and positions of the subslots of the first slot slot 1; and after receiving the slot group, the second device may determine, based on the sequence information of the two subslots in the special code block in the second slot slot 17, that a subslot that carries the sequence information of the two subslots is the subslot 1, and then may determine a sequence and positions of the subslots in the second slot slot 17.

Figure 23:
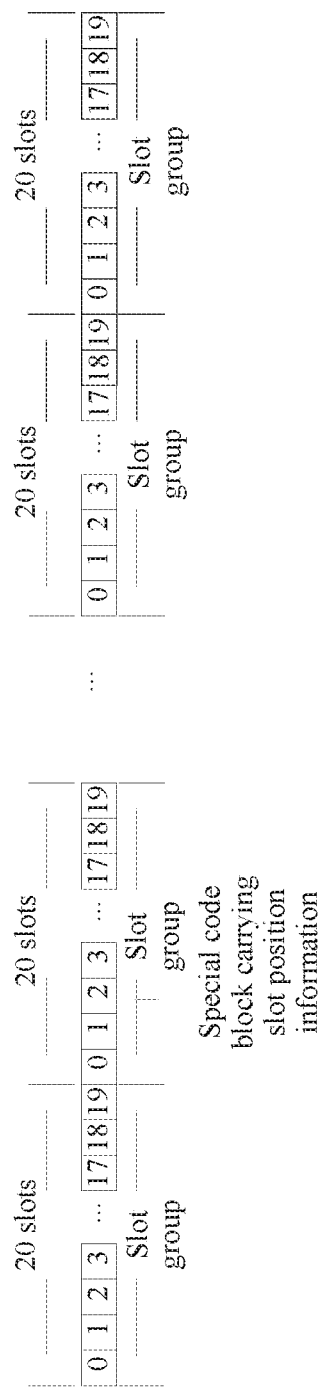
FIG. 23 is a schematic diagram 3 of a slot in another data transmission method according to an embodiment of this application.

For another example, FIG. 23 is a schematic diagram 3 of a slot in another data transmission method according to an embodiment of this application. As shown in FIG. 23, when no slot is divided into subslots, 20 slots in the slot group are used as a whole. A sequence relationship between the 20 slots may be placed in a special code block, and the special code block is placed in one of the 20 slots. As shown in FIG. 22, the special code block is placed in a slot 2 in the 20 slots. In this case, when the 20 slots are used as a whole, no overhead frame needs to be transmitted. After receiving the slot group, the second device may determine a position of each of the 20 slots based on information that a slot carrying the special code block is the slot 2.

In this embodiment, the slot group sent by the third device is received, where the slot group includes the N slots, the slot in the slot group carries the data of the at least one first device, the first slot is any slot in the slot group, the first slot includes the M subslots, the sequence information of the M subslots is located in any one of the M subslots, and both M and N are positive integers: and the data of the at least one first device is restored from the slot in the slot group. Sequence information of subslots of a slot is placed in any subslot of the slot, instead of being placed in an overhead frame, and therefore a receive end can learn of information about a sequence relationship in a relatively short time, reducing a time interval. Further, the receive end learns of the sequence information of the subslots in a relatively short time, and therefore when the receive end restores data in a slot group based on the information about the sequence relationship, a restoration time is shortened. This facilitates fast link establishment, link detection, and dynamic rate switching. Because the sequence information of the subslots is added to the slot in the slot group, the sequence information of the subslots can be transparently transmitted in a large-scale synchronous switching network that is based on a FlexE interface. In addition, the sequence information of the subslots can be transparently transmitted in a synchronous switching network that is based on a non-FlexE interface, so that a device in the synchronous switching network that is based on the non-FlexE interface can obtain the sequence information of the subslots, and then can determine a sequence of the subslots in the slot based on the sequence information of the subslots, to facilitate slot parsing. Furthermore, different slots in the slot group include different quantities of subslots. Therefore, rates of different slots in the slot group are different. In this case, when data is added to different slots, data of FlexE clients with different rates may be placed in different slots, so that data with different rates can be transmitted in one slot group, in other words, slots with hybrid rates can be transmitted, and data of FlexE clients with different rates can be added to one slot group in a hybrid manner. In this application, a single slot is divided, and therefore when a slot is redivided into subslots, another slot is not interfered with.

Figure 24:
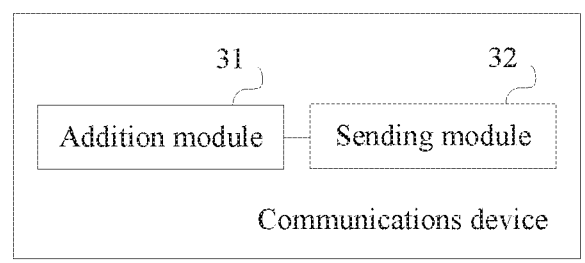
FIG. 24 is a schematic structural diagram of a communications device according to an embodiment of this application.

FIG. 24 is a schematic structural diagram of a communications device according to an embodiment of this application. As shown in FIG. 24, the communications device includes:

an addition module 31, configured to add data of at least one first device to a slot in a slot group, where the slot group includes N slots, a first slot is any slot in the slot group, the first slot includes M subslots, sequence information of the M subslots is located in any one of the M subslots, and both M and N are positive integers; and a sending module 32, configured to send the data of the at least one first device to a second device by using the slot group.

In an optional implementation, a second slot is any slot in the slot group, the second slot includes Q subslots, Q is different from M. and Q is a positive integer; and sequence information of the Q subslots is located in any one of the Q subslots.

In an optional implementation, data of a same first device is located in different slots.

In an optional implementation, data of a same first device is located in different subslots of a same slot.

In an optional implementation, data of different first devices is located in different slots.

In an optional implementation, data of different first devices is located in different subslots of a same slot.

In an optional implementation, the sequence information represents a rank of a subslot that carries the sequence information in a slot.

In an optional implementation, rates of subslots belonging to a same slot are different or the same.

The addition module 31 may perform step 101 in the method shown in FIG. 12, and the sending module 32 may perform step 102 in the method shown in FIG. 12.

The communications device in the embodiment shown in FIG. 24 may be configured to perform the technical solutions of the embodiments shown in FIG. 12 to FIG. 18A and FIG. 18B in the foregoing method. Implementation principles and technical effects thereof are similar, and are not described herein again.

Figure 25:
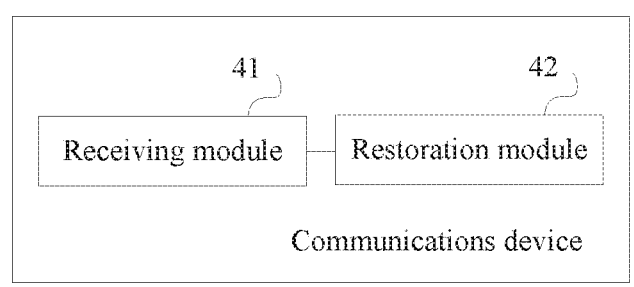
FIG. 25 is a schematic structural diagram of a communications device according to an embodiment of this application.

FIG. 25 is a schematic structural diagram of a communications device according to an embodiment of this application. As shown in FIG. 25, the communications device includes:

a receiving module 41, configured to receive a slot group sent by a third device, where the slot group includes N slots, a slot in the slot group carries data of at least one first device, a first slot is any slot in the slot group, the first slot includes M subslots, sequence information of the M subslots is located in any one of the M subslots, and both M and N are positive integers; and a restoration module 42, configured to restore the data of the at least one first device from the slot in the slot group.

In an optional implementation, in a possible design, a second slot is any slot in the slot group, the second slot includes Q subslots, Q is different from M, and Q is a positive integer; and sequence information of the Q subslots is located in any one of the Q subslots.

In an optional implementation, data of a same first device is located in different slots.

In an optional implementation, data of a same first device is located in different subslots of a same slot.

In an optional implementation, data of different first devices is located in different slots.

In an optional implementation, data of different first devices is located in different subslots of a same slot.

In an optional implementation, the sequence information represents a rank of a subslot that carries the sequence information in a slot.

In an optional implementation, rates of subslots belonging to a same slot are different or the same.

The communications device in the embodiment shown in FIG. 25 may be configured to perform the technical solutions of the embodiments shown in FIG. 19 to FIG. 23 in the foregoing method. Implementation principles and technical effects thereof are similar, and are not described herein again.

The receiving module 41 may perform step 201 in the method shown in FIG. 19, and the restoration module 42 may perform step 202 in the method shown in FIG. 19.

Figure 26:
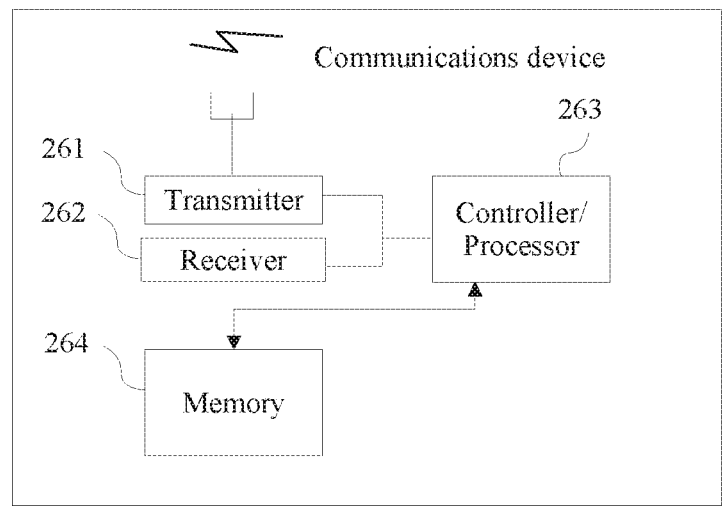
FIG. 26 is a schematic structural diagram of another communications device according to an embodiment of this application.

FIG. 26 is a schematic structural diagram of another communications device according to an embodiment of this application. As shown in FIG. 26, the communications device includes a transmitter 261, a receiver 262, and a processor 263.

The processor 263 is configured to add data of at least one first device to a slot in a slot group, where the slot group includes N slots, a first slot is any slot in the slot group, the first slot includes M subslots, sequence information of the M subslots is located in any one of the M subslots, and both M and N are positive integers. In this case, the processor 263 may implement a function of the addition module 31 in the device shown in FIG. 24. Further, the processor 263 may perform step 101 in the method shown in FIG. 12.

The transmitter 261 is configured to send the data of the at least one first device to a second device by using the slot group. In this case, the transmitter 261 may implement a function of the sending module 32 in the device shown in FIG. 24. Further, the transmitter 261 may perform step 102 in the method shown in FIG. 12.

In an optional implementation, a second slot is any slot in the slot group, the second slot includes Q subslots, Q is different from M, and Q is a positive integer; and sequence information of the Q subslots is located in any one of the Q subslots.

In an optional implementation, data of a same first device is located in different slots.

In an optional implementation, data of a same first device is located in different subslots of a same slot.

In an optional implementation, data of different first devices is located in different slots.

In an optional implementation, data of different first devices is located in different subslots of a same slot.

In an optional implementation, the sequence information represents a rank of a subslot that carries the sequence information in a slot.

In an optional implementation, rates of subslots belonging to a same slot are different or the same.

The communications device in the embodiment shown in FIG. 26 may be configured to perform the technical solution of the foregoing method embodiment, or execute a program of each module in the embodiment shown in FIG. 24. The processor 263 invokes the program to perform the operations in the foregoing method embodiment, to implement the modules shown in FIG. 24.

The processor 263 may alternatively be a controller, and is indicated as a "controller/processor 263" in FIG. 26. The transmitter 261 and the receiver 262 are configured to support the communications device in sending information to and receiving information from the first device and the second device in the foregoing embodiment. The processor 263 performs various functions used for communication with the first device and the second device.

The communications device may further include a memory 264. The memory 264 is configured to store program code and data of the communications device.

The processor 263 is, for example, a central processing unit (central processing unit, CPU), or may be one or more integrated circuits, for example, one or more application specific integrated circuits (application specific integrated circuit, ASIC), one or more microprocessors (digital signal processor, DSP), or one or more field programmable gate arrays (field programmable gate array, FPGA), configured to implement the foregoing method. The memory 264 may be a memory, or may be a general name of a plurality of storage elements.

It should be noted that, the transmitter 261 included in the communications device in FIG. 26 provided in this embodiment of this application may correspondingly perform the sending action in the foregoing method embodiment, the processor 263 may perform processing actions such as the processing action, the determining action, and the obtaining action, and the receiver may perform the receiving action. For details, refer to the foregoing method embodiment.

Alternatively, some or all of the foregoing modules may be implemented in a form of an integrated circuit embedded in a chip of the device. In addition, the modules may be independently implemented, or may be integrated together. That is, the foregoing modules may be one or more integrated circuits, for example, one or more ASICs, one or more DSPs, or one or more FPGAs, configured to implement the foregoing method.

Figure 27:
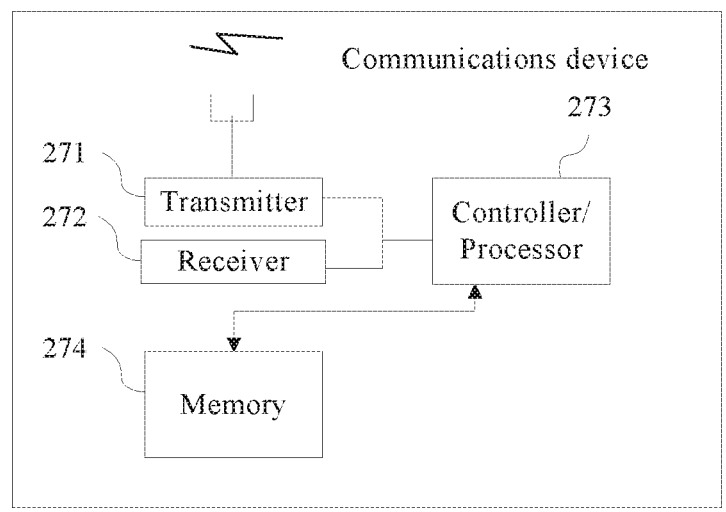
FIG. 27 is a schematic structural diagram of another communications device according to an embodiment of this application.

FIG. 27 is a schematic structural diagram of another communications device according to an embodiment of this application. As shown in FIG. 27, the communications device includes a transmitter 271, a receiver 272, and a processor 273.

The receiver 272 is configured to receive a slot group sent by a third device, where the slot group includes N slots, a slot in the slot group carries data of at least one first device, a first slot is any slot in the slot group, the first slot includes M subslots, sequence information of the M subslots is located in any one of the M subslots, and both M and N are positive integers. In this case, the receiver 272 may implement a function of the receiving module 41 in the device shown in FIG. 25. Further, the receiver 272 may perform step 201 in the method shown in FIG. 19.

The processor 273 is configured to restore the data of the at least one first device from the slot in the slot group. In this case, the processor 273 may implement a function of the restoration module 42 in the device shown in FIG. 25. Further, the processor 273 may perform step 202 in the method shown in FIG. 19.

In an optional implementation, in a possible design, a second slot is any slot in the slot group, the second slot includes Q subslots, Q is different from M, and Q is a positive integer: and sequence information of the Q subslots is located in any one of the Q subslots.

In an optional implementation, data of a same first device is located in different slots.

In an optional implementation, data of a same first device is located in different subslots of a same slot.

In an optional implementation, data of different first devices is located in different slots.

In an optional implementation, data of different first devices is located in different subslots of a same slot.

In an optional implementation, the sequence information represents a rank of a subslot that carries the sequence information in a slot.

In an optional implementation, rates of subslots belonging to a same slot are different or the same.

The communications device in the embodiment shown in FIG. 27 may be configured to perform the technical solution of the foregoing method embodiment, or execute a program of each module in the embodiment shown in FIG. 25. The processor 273 invokes the program to perform the operations in the foregoing method embodiment, to implement the modules shown in FIG. 25.

The processor 273 may alternatively be a controller, and is indicated as a "controller/processor 273" in FIG. 27. The transmitter 271 and the receiver 272 are configured to support the communications device in sending information to and receiving information from the third device in the foregoing embodiment. The processor 273 performs various functions used for communication with the third device.

The communications device may further include a memory 274. The memory 274 is configured to store program code and data of the communications device.

The processor 273 is, for example, a CPU, or may be one or more integrated circuits, for example, one or more ASICs, one or more DSPs, or one or more FPGAs, configured to implement the foregoing method. The memory 274 may be a memory, or may be a general name of a plurality of storage elements.

It should be noted that, the transmitter 271 included in the communications device in FIG. 27 provided in this embodiment of this application may correspondingly perform the sending action in the foregoing method embodiment, the processor 273 may perform processing actions such as the processing action, the determining action, and the obtaining action, and the receiver may perform the receiving action. For details, refer to the foregoing method embodiment.

Alternatively, some or all of the foregoing modules may be implemented in a form of an integrated circuit embedded in a chip of the device. In addition, the modules may be independently implemented, or may be integrated together. That is, the foregoing modules may be one or more integrated circuits, for example, one or more ASICs, one or more DSPs, or one or more FPGAs, configured to implement the foregoing method.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk (solid state disk, SSD)), or the like.

A person skilled in the art should be aware that in the foregoing one or more examples, the functions described in the embodiments of this application may be implemented by hardware, software, firmware, or any combination thereof. When the functions are implemented by software, the functions may be stored in a computer readable medium or transmitted as one or more instructions or code in a computer readable medium. The computer readable medium includes a computer storage medium and a communications medium, where the communications medium includes any medium that enables a computer program to be transmitted from one place to another. The storage medium may be any available medium accessible to a general purpose or dedicated computer.

What is claimed is:

1. A data transmission method, comprising:
adding data of at least one first device to a first slot in a slot group comprising N slots, wherein the first slot comprises M subslots, sequence information of the M subslots is located in at least one of the M subslots, and both M and N are positive integers; and
sending the data of the at least one first device to a second device by using the slot group.

2. The method according to claim 1, wherein
a second slot of the N slots included in the slot group comprises Q subslots, where Q is different from M, and Q is a positive integer, and
sequence information of the Q subslots is located in at least one of the Q subslots.

3. The method according to claim 1, wherein the sequence information represents a rank of a subslot that carries the sequence information.

4. The method according to claim 1, wherein rates of subslots belonging to a same slot are the same.

5. The method according to claim 1, wherein rates of subslots belonging to a same slot are different.

6. A data transmission method, comprising:
processing, by a first device, a slot group received from a second device, wherein the slot group comprises N slots, a first slot of the N slots included in the slot group carries data of the first device, the first slot comprises M subslots, sequence information of the M subslots is located in at least one of the M subslots, and both M and N are positive integers; and
restoring the data of the first device from the first slot in the slot group.

7. The method according to claim 6, wherein
a second slot of the N slots included in the slot group comprises Q subslots, where Q is different from M, and Q is a positive integer, and
sequence information of the Q subslots is located in at least one of the Q subslots.

8. The method according to claim 6, wherein the sequence information represents a rank of a subslot that carries the sequence information in a slot.

9. The method according to claim 6, wherein rates of subslots belonging to a same slot are the same.

10. The method according to claim 6, wherein rates of subslots belonging to a same slot are different.

11. A communications device, comprising:
a processor, configured to add data of at least one first device to a first slot in a slot group comprising N slots, wherein the first slot comprises M subslots, sequence information of the M subslots is located in at least one of the M subslots, and both M and N are positive integers; and
a sender, configured to send the data of the at least one first device to a second device by using the slot group.

12. The method according to claim 11, wherein
a second slot of the N slots included in the slot group comprises Q subslots, where Q is different from M, and Q is a positive integer, and
sequence information of the Q subslots is located in at least one of the Q subslots.

13. The communications device according to claim 11, wherein the sequence information represents a rank of a subslot that carries the sequence information in a slot.

14. The communications device according to claim 11, wherein rates of subslots belonging to a same slot are the same.

15. The method according to claim 14, wherein rates of subslots belonging to a same slot are different.

* * * * *